(12) United States Patent
Park et al.

(10) Patent No.: US 9,886,089 B2
(45) Date of Patent: Feb. 6, 2018

(54) METHOD AND APPARATUS FOR CONTROLLING VIBRATION

(71) Applicant: Samsung Electronics Co., Ltd., Gyeonggi-do (KR)

(72) Inventors: Jin-Hyoung Park, Gyeonggi-do (KR); Yeon-Gyeong Gil, Gyeonggi-do (KR); Myung-Hwan Lee, Ulsan (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/283,762

(22) Filed: May 21, 2014

(65) Prior Publication Data

US 2014/0347298 A1 Nov. 27, 2014

(30) Foreign Application Priority Data

May 21, 2013 (KR) ........................ 10-2013-0057328

(51) Int. Cl.
*G06F 3/01* (2006.01)
*G06F 3/0484* (2013.01)
*A63F 13/00* (2014.01)
*G06F 1/16* (2006.01)
*G06F 3/0354* (2013.01)

(52) U.S. Cl.
CPC ............. *G06F 3/016* (2013.01); *A63F 13/00* (2013.01); *G06F 1/1626* (2013.01); *G06F 3/03545* (2013.01); *G06F 3/04845* (2013.01); *G06F 2203/013* (2013.01); *G06F 2203/014* (2013.01); *G06F 2203/04806* (2013.01)

(58) Field of Classification Search
CPC .. G06F 3/03545; G06F 3/04845; G06F 3/016; G06F 2203/04806; G06F 2203/014; G06F 2203/013
See application file for complete search history.

(56) References Cited

U.S. PATENT DOCUMENTS

| 6,563,494 B1 | 5/2003 | Eichstaedt et al. |
| 9,164,638 B2 | 10/2015 | Fang et al. |
| 2006/0132455 A1 | 6/2006 | Rimas-Ribikauskas et al. |

(Continued)

FOREIGN PATENT DOCUMENTS

| KR | 1020090054362 | 5/2009 |
| KR | 1020090095295 | 9/2009 |

OTHER PUBLICATIONS

U.S. Office Action dated Oct. 31, 2016 issued in counterpart U.S. Appl. No. 14/924,208, 12 pages.

(Continued)

*Primary Examiner* — Latanya Bibbins
(74) *Attorney, Agent, or Firm* — The Farrell Law Firm, P.C.

(57) ABSTRACT

A method and apparatus for controlling vibration in a portable device are provided. The method includes detecting a user input corresponding to a gesture made on a touch screen by an input device, detecting an action attribute of the portable device corresponding to the user input, determining a first vibration to be output from the input device and a second vibration to be output from the portable device according to the action attribute, and controlling output of the first vibration from the input device and output of the second vibration from the portable device according to the action attribute.

6 Claims, 23 Drawing Sheets

(56) References Cited

U.S. PATENT DOCUMENTS

| | | | |
|---|---|---|---|
| 2008/0132313 A1* | 6/2008 | Rasmussen | G07F 17/32 463/16 |
| 2009/0135164 A1* | 5/2009 | Kyung | G06F 3/03545 345/179 |
| 2011/0163944 A1 | 7/2011 | Bilbrey et al. | |
| 2011/0267182 A1* | 11/2011 | Westerinen | G06F 3/016 340/407.2 |
| 2012/0169776 A1* | 7/2012 | Rissa | G06F 3/04883 345/676 |
| 2014/0139452 A1* | 5/2014 | Levesque | G06F 3/0414 345/173 |
| 2014/0253468 A1 | 9/2014 | Havillo et al. | |
| 2014/0253469 A1 | 9/2014 | Hicks et al. | |

OTHER PUBLICATIONS

Korean Office Action dated Mar. 31, 2017 issued in counterpart application No. 10-2013-0057328, 7 pages.

U.S. Office Action dated Jul. 14, 2017 issued in counterpart U.S. Appl. No. 14/924,208, 17 pages.

\* cited by examiner

METHOD AND APPARATUS FOR CONTROLLING VIBRATION

PRIORITY

This application claims priority under 35 U.S.C. §119(a) to a Korean Patent Application filed in the Korean Intellectual Property Office on May 21, 2013 and assigned Serial No. 10-2013-0057328, the entire disclosure of which is incorporated herein by reference.

BACKGROUND

1. Field of the Invention

The present invention generally relates to a portable device, and more particularly, to a method and apparatus for controlling vibration in a portable device and an input device.

2. Description of the Related Art

Portable devices have recently provided more and more services and additional functions. In order to increase the utility of portable devices and satisfy various user demands, a variety of applications have been developed for the portable devices.

Portable devices, such as a smart phone or a tablet Personal Computer (PC), are capable of storing a large number of such applications. Shortcut keys are displayed in the form of icons on the touch screen of a portable device to execute the individual applications. A user can execute an intended application in the portable device by touching one of the displayed icons. In addition to the shortcut keys, various visual objects including widgets, photos, and text are displayed on the touch screen of the portable device.

Information is input to the portable device by touching the displayed objects using an input device such as a user's finger, an electronic pen, a stylus pen, or the like.

An input can be applied by hovering the input device over the touch screen in a non-contact manner as well as directly touching the touch screen in the portable device. Thus a user-friendly User Interface (UI) is provided.

Recently, a portable device has been configured so as to generate vibration upon receipt of a touch input on a touch screen, in order to provide a feeling to a user that simulates pressing a button. Research has been made on various touch input techniques to satisfy user demands for new, pleasant multi-sense interfaces.

As described above, in the related art when a user manipulates a portable device, the portable device provides vibration to the user through a touch screen so as to given a sense of manipulation to the user. With this scheme, the user may only feel a touch of an input device on the touch screen, without a real feeling of using an application. Accordingly, there is a need for providing an improved UI input device to satisfy increasing user demands for a touch input of an input device beyond a simple role of selecting an object displayed on a touch screen.

SUMMARY

The present invention has been made to address at least the above-mentioned problems and/or disadvantages and to provide at least the advantages described below. Accordingly, an aspect of the present invention is to provide a method and apparatus for, when a user manipulates a User Interface (UI) in a portable device equipped with at least one touch screen, organically generating vibration between an input device and the portable device.

In accordance with an aspect of the present invention, there is provided a method for controlling vibration in a portable device. The method includes detecting a user input corresponding to a gesture made on a touch screen by an input device, detecting an action attribute of the portable device corresponding to the user input, determining a first vibration to be output from the input device and a second vibration to be output from the portable device according to the action attribute, determining generation times of the first and second vibrations according to the action attribute, and controlling output of the first vibration from the input device and output of the second vibration from the portable device according to the action attribute.

In accordance with another aspect of the present invention, there is provided a portable device. The portable device includes a touch screen configured to display at least one object under the control of a controller, a communication module configured to conduct short-range communication with an input device under the control of the controller, and the controller configured to detect a user input corresponding to a gesture made on the touch screen by the input device, to detect an action attribute of the portable device corresponding to the user input, to determine a first vibration to be output from the input device and a second vibration to be output from the portable device according to the action attribute, to determine generation times of the first and second vibrations according to the action attribute, to control output of the first vibration from the input device by transmitting a control signal corresponding to the first vibration to the input device according to the attribute action through the communication module, and to control output of the second vibration from the portable device according to the action attribute.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention provides an organic vibration feedback between a portable device equipped with a touch screen and an input device, when a user input is applied to the touch screen of the portable device through the input device.

According to the present invention, upon detection of a user input corresponding to a gesture made on the touch screen by the input device, the portable device detects an action attribute of the portable device corresponding to the user input, determines a first vibration to be output from the input device and a second vibration to be output from the portable device according to the action attribute, and controls output of the respective first and second vibrations from the input device and the portable device, respectively.

The action attribute includes application information related to an application that is being executed when the user input is detected, for example, state information related to a progress of the application. The action attribute may also include a command corresponding to the user input in relation to the progress state of the application at the moment the user input is detected.

Figure 1:
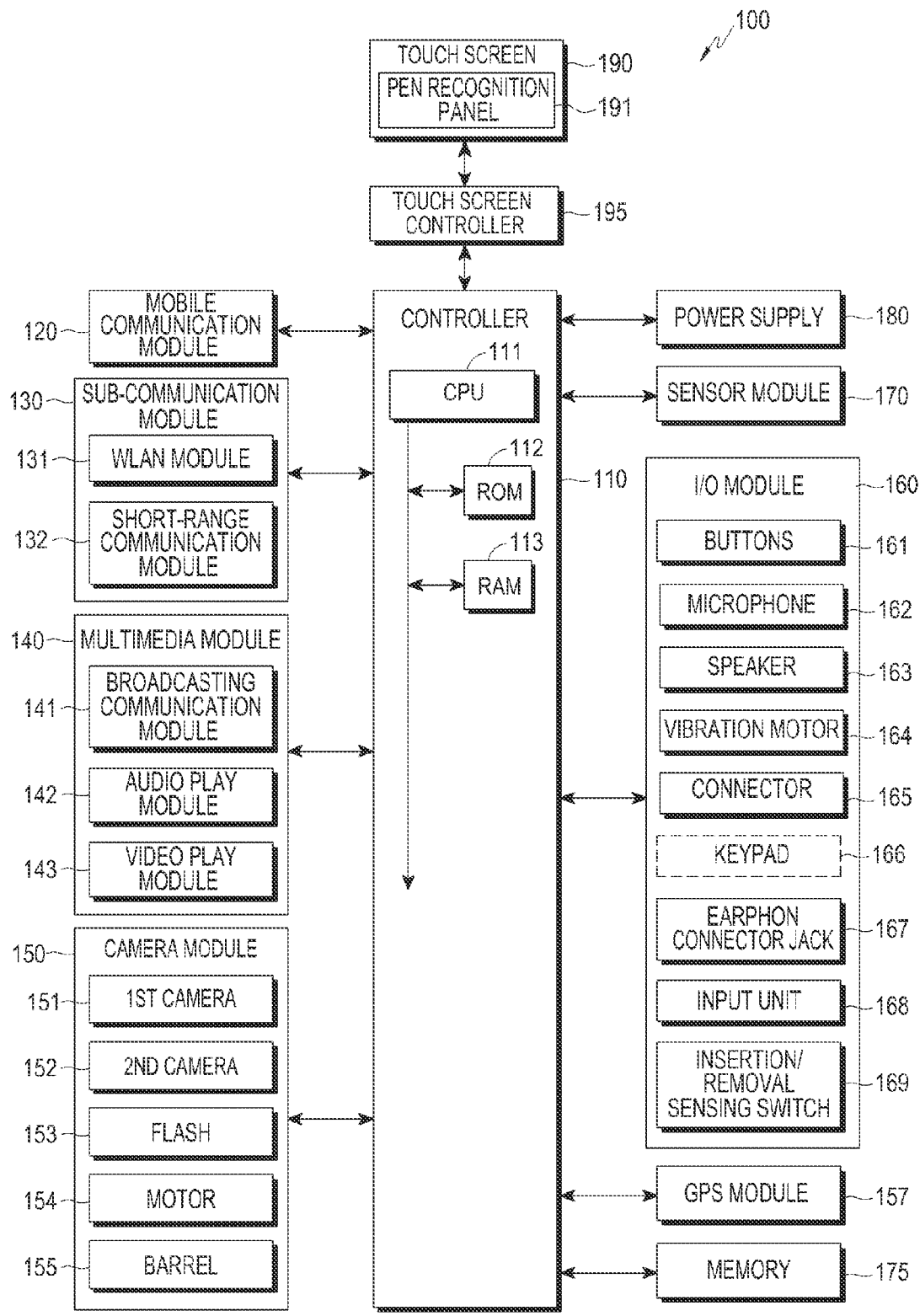
FIG. 1 is a block diagram of a portable device according to an embodiment of the present invention.

An example of a portable device to which the present invention is applied is illustrated in FIG. 1. FIG. 1 is a block diagram of a portable device according to an embodiment of the present invention.

Referring to FIG. 1, the portable device 100 may be connected to an external device through at least one of a mobile communication module 120, a sub-communication module 130, a connector 165, and an earphone connector jack 167. The term "external device" covers a variety of devices that can be detachably connected to the portable device 100 by wire, such as an earphone, an external speaker, a Universal Serial Bus (USB) memory, a charger, a cradle, a docking station, a Digital Multimedia Broadcasting (DMB) antenna, a mobile payment device, a health care device (for example, a blood sugar meter, etc.), a game console, a vehicle navigator, and the like. The external device may also include a device wirelessly connectable to the portable device 100 by short-range communication, such as a Bluetooth communication device, a Near Field Communication (NFC) device, a Wireless Fidelity (WiFi) Direct communication device, a wireless Access Point (AP), and the like. In addition, the portable device may be connected to another device by wire or wirelessly, such as a portable phone, a smartphone, a tablet Personal Computer (PC), a desktop PC, a server, and the like.

Referring to FIG. 1, the portable device 100 includes at least one touch screen 190 and at least one touch screen controller 195. The portable device 100 further includes a controller 110, the mobile communication module 120, the sub-communication module 130, a multimedia module 140, a camera module 150, a Global Positioning System (GPS) module 157, an Input/Output (I/O) module 160, a sensor module 170, a memory 175, and a power supply 180.

The sub-communication module 130 includes at least one of a Wireless Local Area Network (WLAN) module 131 and a short-range communication module 132, and the multimedia module 140 includes at least one of a broadcasting communication module 141, an audio play module 142, and a video play module 143. The camera module 150 includes at least one of a first camera 151 and a second camera 152. In the portable device 100 of the present invention, the camera module 150 may include at least one of a barrel 155 for zooming in or zooming out the first camera 151 and/or the second camera 152, a motor 154 for controlling movement of the barrel 155 for zoom-in or zoom-out, and a flash 153 for providing a light source to capture an image. The I/O module 160 includes at least one of buttons 161, a microphone 162, a speaker 163, a vibration motor 164, the connector 165, and a keypad 166.

The controller 110 may include a Central Processing Unit (CPU) 111, a Read Only Memory (ROM) 112 for storing a control program to control the portable device 100, and a Random Access Memory (RAM) 113 for storing signals or data received from the outside of the portable device 100 or for use as a memory space for an operation performed by the portable device 100. The CPU 111 may include one or more cores. The CPU 111, the ROM 112, and the RAM 113 may be interconnected through an internal bus.

The controller 110 controls the mobile communication module 120, the sub-communication module 130, the multimedia module 140, the camera module 150, the GPS module 157, the I/O module 160, the sensor module 170, the memory 175, the power supply 180, the touch screen 190, and the touch screen controller 195.

With a plurality of objects displayed on the touch screen 190, the controller 110 detects a user input on the touch screen 190, corresponding to a gesture made by a touch input device 168 such as an electronic pen. In an embodiment of the present invention, the user input corresponding to the gesture of the input device 168 may include a touch input created by directly touching the touch screen 190 and a hovering input created by hovering the input device 168 above the touch screen 190.

With a plurality of objects displayed on the touch screen 190, the controller 110 determines whether the touch input device 168 such as an electronic pen has approached an object and has hovered above the object and identifies the object corresponding to the position of the hovering. Further, the controller 110 determines the height of the input device 168 above the portable device 100 and sense a hovering input event according to the height. The hovering input event includes at least one of pressing of a button formed in the input device 168, a tap of the input device 168, faster movement of the input device 168 than a predetermined speed, and a touch on an object. A different vibration pattern may be set according to the distance between the input device 168 and the touch screen 190. Distances for which different vibration patterns are set may vary. Upon generation of a hovering input event, the controller 110 may display a predetermined hovering input effect corresponding to the hovering input event on the touch screen 190.

The controller 110 detects an action attribute corresponding to a user input. The action attribute includes at least one of application information related to a progress state of an application that is being executed when the user input is applied to the portable device 100, and a command corresponding to the user input. The application information includes at least one of identification information about the ongoing application, state information about the application in relation to the progress of the application, and information about an object selected by the user input from among at least one object displayed on the touch screen 190 along with the progress of the application. The command generated by the user input may be determined according to the type and progress state of the ongoing application or the selected object.

The controller 110 determines a first vibration to be output from the input device 168 or a second vibration to be output from the portable device 100 according to the attribute action detected corresponding to the touch input or the hovering input of the input device 168, determines generation times of the first and second vibrations to be output from the input device 168 and the portable device 100, and controls output of the first and second vibrations. Specifically, the controller 110 controls output of the first vibration from the input device 168 by transmitting a control signal corresponding to the first vibration to the input device 168 at a determined time point according to the action attribute. In addition, the controller 110 controls output of the second vibration from the portable device 100 by controlling a vibration motor 164 according to the action attribute, so that the vibration motor 164 may generate the second vibration at a determined time point.

For example, after the input device 168 generates the first vibration, the controller 110 may control generation of the second vibration from the portable device 100 according to the action attribute. Alternatively, after the portable device 100 generates the second vibration, the controller 110 may also control generation of the first vibration from the input device 168 according to the action attribute. The controller 110 may also control simultaneous generation of the first vibration and the second vibration from the input device 168 and the portable device 100.

Since each of the two devices generates vibration organically in response to a user input, a user may feel a realistic sense of manipulation.

The mobile communication module 120 may connect the portable device 100 to an external device through one or more antennas by mobile communication under the control of the controller 110. The mobile communication module 120 transmits wireless signals to or receives wireless signals from a portable phone, a smart phone, a tablet PC, or another electronic device that has a phone number input to the portable device 100, for a voice call, a video call, a Short Message Service (SMS), or a Multimedia Messaging Service (MMS).

The sub-communication module 130 includes at least one of the WLAN module 131 and the short-range communication module 132. For example, the sub-communication module 130 may include either or both of the WLAN module 131 and the short-range communication module 132.

The WLAN module 131 may be connected to the Internet under the control of the controller 110 in a place where a wireless AP is installed. The WLAN module 131 supports the WLAN standard IEEE802.11x of the Institute of Electrical and Electronics Engineers (IEEE). The short-range communication module 132 conducts short-range wireless communication between the portable device 100 and an image forming device under the control of the controller 110. The short-range communications scheme may conform to Bluetooth, Infrared Data Association (IrDA), WiFi Direct, Near Field Communication (NFC), and the like.

The controller 110 transmits a control signal for vibration to the input device 168 through at least one of the WLAN module 131 and the short-range communication module 132 of the sub-communication module 130.

The portable device 100 includes at least one of the mobile communication module 120, the WLAN module 131, and the short-range communication module 132 according to its capabilities. For example, the portable device 100 may include a combination of the mobile communication module 120, the WLAN module 131, and the short-range communication module 132. In the present invention, at least one or a combination of two or more of the mobile communication module 120, the WLAN module 131, and the short-range communication module 132 is referred to as a transceiver, which should not be construed as limiting the scope of the present invention.

The multimedia module 140 includes the broadcasting communication module 141, the audio play module 142, or the video play module 143. The broadcasting communication module 141 may receive a broadcast signal (for example, a TV broadcast signal, a radio broadcast signal, a data broadcast signal, etc.) and additional broadcasting information (for example, an Electronic Program Guide (EPG), Electronic Service Guide (ESG), etc.) from a broadcasting station through a broadcasting communication antenna under the control of the controller 110. The audio play module 142 may open a stored or received digital audio file (for example, a file having such an extension as mp3, wma, ogg, or way) under the control of the controller 110. The video play module 143 may open a stored or received digital video file (for example, a file having such an extension as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. One or both of the audio play module 142 and the video play module 143 of the multimedia module 140 may be incorporated into the controller 110.

The camera module 150 includes at least one of the first camera 151 and the second camera 152, for capturing a still image or a video under the control of the controller 110. The camera module 150 may include at least one of the barrel 155 for zooming in or zooming out the first camera 151 and/or the second camera 152, the motor 154 for controlling movement of the barrel 155 for zoom-in or zoom-out, and the flash 153 for providing a light source to capture an image. The first camera 151 may be disposed on the front surface of the portable device 100, while the second camera 152 may be disposed on the rear surface of the portable device 100. Alternatively, the first camera 151 and the second camera 152 may be arranged near to each other (for example, the distance between the first camera 151 and the second camera 152 is between 1 cm and 8 cm) in order to capture a three-dimensional still image or video.

Each of the first and second cameras 151 and 152 may include a lens system and an image sensor. The first and second cameras 151 and 152 convert optical signals received through (or captured by) the lens systems to electrical image signals and output the electrical image signals to the controller 110. The user may capture a video or a still image using the first and second cameras 151 and 152.

The GPS module 157 receives radio waves from a plurality of GPS satellites in the Earth's orbit and determines a position of the portable device 100 based on the Time of Arrivals (ToAs) of satellite signals from the GPS satellites to the portable device 100.

The I/O module 160 may include at least one of the plurality of buttons 161, the microphone 162, the speaker 163, the vibration motor 164, the connector 165, and the keypad 166, to which the I/O module 160 is not limited. A cursor control such as a mouse, a trackball, a joystick, or cursor directional keys may be provided for communication with the controller and for control of cursor movement on the touch screen 190.

The buttons 161 may be formed on the front surface, a side surface, or the rear surface of a housing of the portable device 100, and may include at least one of a power/lock button, a volume button, a menu button, a home button, a back button, a search button, etc.

The microphone 162 receives a voice or a sound and converts the received voice or sound to an electrical signal under the control of the controller 110.

The speaker 163 outputs sounds corresponding to various signals (for example, a wireless signal, a broadcast signal, a digital audio file, a digital video file, a photo shot, etc.) received from the mobile communication module 120, the sub-communication module 130, the multimedia module 140, and the camera module 150 and a sound corresponding to a control signal transmitted to the input device 168 by Bluetooth to the outside of the portable device 100 under the control of the controller 110. The sound corresponding to the control signal includes a sound related to activation of a vibration device 520 (See FIG. 5), a sound having a variable volume according to a vibration strength, and a sound related to deactivation of the vibration device 520. The volume of the sound may be controlled according to the vibration strength of the vibration device 520 in the input device 168, or the sound may be output through the speaker 163 of the portable device 100 and/or a speaker (not shown) that may be provided in the input device 168, simultaneously with activation of the vibration device 520 or within a predetermined time (for example, 10 ms) before or after activation of the vibration device 520. The sound may end simultaneously with deactivation of the vibration device 520 or a predetermined time (for example, 10 ms) before or after deactivation of the vibration device 520. The speaker 163 may output sounds corresponding to functions (for example, a button manipulation sound, a ringback tone for a call, etc.) performed by the portable device 100. One or more speakers 163 may be disposed at an appropriate position or positions of the housing of the portable device 100.

The vibration motor 164 converts an electrical signal to a mechanical vibration under the control of the controller 110. For example, when the portable device 100 receives an incoming voice call from another device (not shown) in vibration mode, the vibration motor 164 operates. One or more vibration motors 164 may be mounted inside the housing of the portable device 100. The vibration motor 164 may operate in response to a user's touch on the touch screen 190 and a continuous movement of the touch on the touch screen 190.

The connector 165 may be used as an interface for connecting the portable device 100 to an external device or a power source. The connector 165 may transmit data stored in the memory 175 to the external device via a cable connected to the connector 165 or may receive data from the external device via the cable, under the control of the controller 110. The portable device 100 receives power or charge a battery from the power supply via the cable connected to the connector 165.

The keypad 166 receives a key input from the user to control the portable device 100. The keypad 166 includes a physical keypad formed in the portable device 100 or a virtual keypad displayed on the touch screen 190. The physical keypad may or may not be provided according to the capabilities or configuration of the portable device 100.

Figure 3:
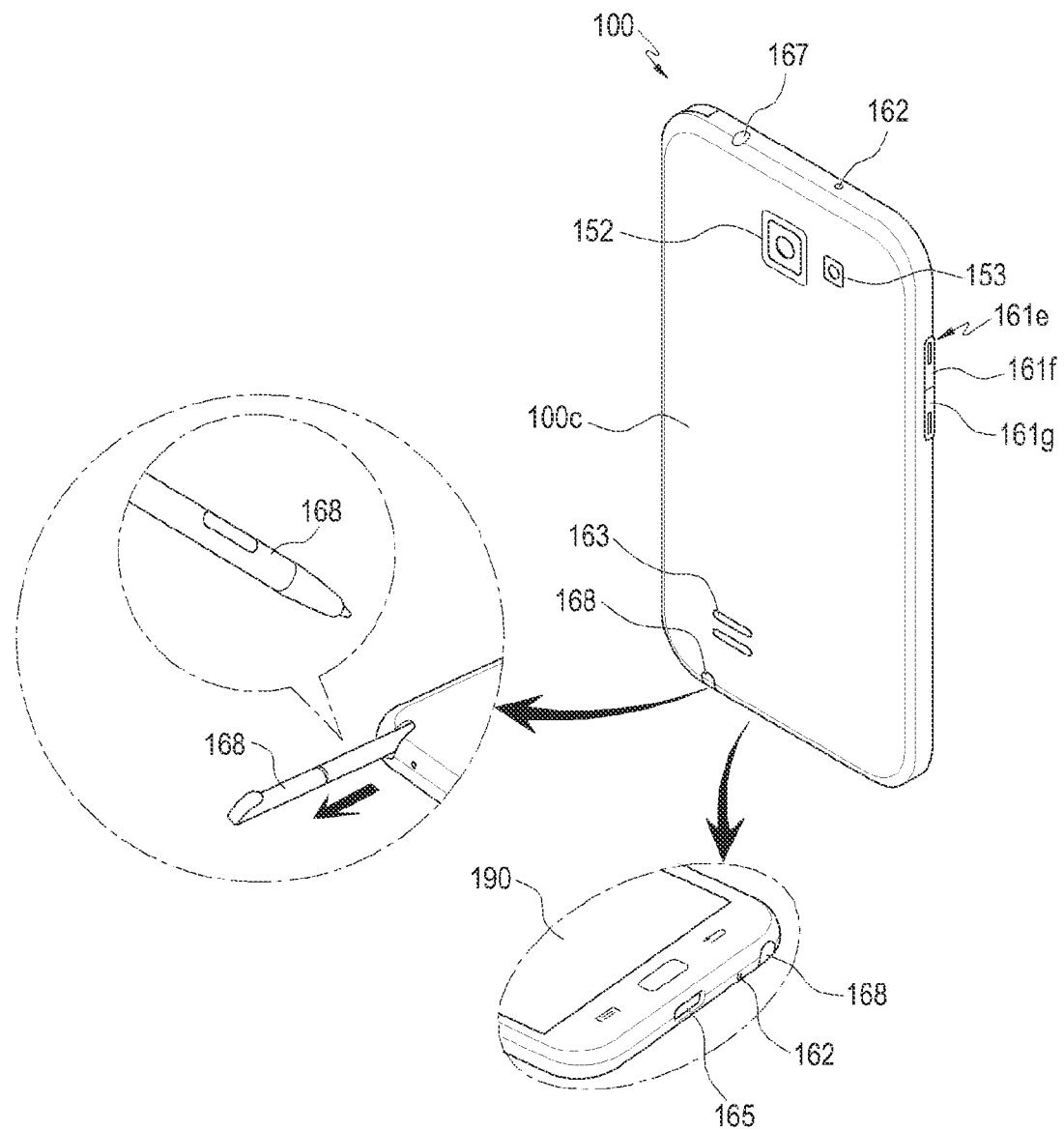
FIG. 3 is a rear perspective view of a portable device according to an embodiment of the present invention.

An earphone may be connected to the portable device 100 by being inserted into the earphone connector jack 167. The input device 168 may be inserted and kept inside the portable device 100, as shown in FIG. 3. When the input device 168 is used, it may be extended or removed from the portable device 100. An insertion/removal sensing switch 169 is provided in an internal area of the portable device 100 into which the input device 168 is inserted, in order to operate in response to insertion and removal of the input device 168. The insertion/removal sensing switch 169 outputs signals corresponding to insertion and removal of the input device 168 to the controller 110. The insertion/removal sensing switch 169 may be configured so as to directly or indirectly contact the input device 168, when the input device 168 is inserted. Therefore, the insertion/removal sensing switch 169 outputs, to the controller 110, a signal corresponding to insertion or removal of the input device 168 depending on whether the insertion/removal sensing switch 169 contacts the input device 168 directly or indirectly.

The sensor module 170 includes at least one sensor for detecting a state of the portable device 100. For example, the sensor module 170 may include a proximity sensor for detecting whether the user is close to the portable device 100, an illumination sensor for detecting the amount of ambient light around the portable device 100, a motion sensor for detecting a motion of the portable device 100 (for example, rotation, acceleration, vibration, etc. of the portable device 100), a geomagnetic sensor for detecting a point of the compass using the Earth's magnetic field, a gravity sensor for detecting the direction of gravity, an altimeter for detecting an altitude by measuring the air pressure, and the like. At least one sensor detects a state of the portable device 100, generates a signal corresponding to the detected state, and transmits the generated signal to the controller 110. A sensor may be added to or removed from the sensor module 170 according to the capabilities of the portable device 100.

The memory 175 stores input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 stores a control program for controlling the portable device 100 or the controller 110, and applications.

The term "memory" may include the memory 175, the ROM 112 and the RAM 113 within the controller 110, or a memory card (for example, a Secure Digital (SD) card, a memory stick, etc.) mounted to the portable device 100. The memory may also include a non-volatile memory, a volatile memory, a Hard Disk Drive (HDD), a Solid State Drive (SSD), and the like.

The memory 175 stores applications having various functions such as navigation, video call, game, and time-based alarm applications, images used to provide Graphical User Interfaces (GUIs) related to the applications, user information, text, databases or data related to a method of processing a touch input, background images (for example, a menu screen, a waiting screen, and the like) or operation programs required to operate the portable device 100, and images captured by the camera module 150.

For each application, the memory 175 stores information related to vibration to be generated from the portable device 100 or the input device 168 according to the progress state of the application, a user input, or a command corresponding to the user input.

The memory 175 may be a machine-readable medium (for example, a computer-readable medium). The machine-readable medium may be defined as a medium that provides data to a machine so that the machine may perform a specific function. For example, the machine-readable medium may be a storage medium. The memory 175 may include a non-volatile medium and a volatile medium. All these media should be of a type providing commands detectable by a physical device that reads commands to a machine.

The machine-readable medium includes, but not limited to, at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), and a Flash-EPROM.

The power supply 180 supplies power to one or more batteries mounted in the housing of the portable device 100 under the control of the controller 110. The one or more batteries supply power to the portable device 100. Further, the power supply 180 supplies power received from an external power source via the cable connected to the connector 165 to the portable device 100. The power supply 180 may also supply power received wirelessly from an external power source to the portable device 100 by a wireless charging technology.

The portable device 100 includes at least one touch screen 190 for providing User Interfaces (UIs) corresponding to various services (for example, call, data transmission, broadcasting, photography, etc.) to the user. Each touch screen 190 transmits an analog signal corresponding to at least one touch on a UI to a touch screen controller 195 corresponding to the touch screen 190. The portable device 100 may be provided with a plurality of touch screens 190 and touch screen controllers 195 which receive an analog signal corresponding to a touch from the respective touch screens 190. The touch screens 190 may be connected respectively to a plurality of housings by hinges or to one housing without a hinge connection. For the convenience of description, the following description is given in the context of a single touch screen.

The touch screen 190 may receive at least one touch input through a user's body part (for example, a finger) or a touch input tool (for example, a stylus pen or an electronic pen). The touch screen 190 may include a pen recognition panel 191 that recognizes an input of a pen such as a stylus pen or an electronic pen. The pen recognition panel 191 may determine the distance between the pen and the touch screen 190 by a magnetic field. The touch screen 190 may receive a continuous movement of a single touch, among one or more touches. The touch screen 190 may transmit an analog signal corresponding to a continuous movement of a touch to the touch screen controller 195.

In the present invention, the touch may include a non-contact touch (for example, where a detectable gap between the touch screen 190 and the user's body part or the input device 168 is about 5 mm), and is not limited to contacts between the touch screen 190 and the user's body part or the input device 168. The detectable gap to the touch screen 190 may vary according to the capabilities or configuration of the portable device 100. Particularly, to distinguish a touch event generated by contact between the touch screen 190 and a user's body or the input device 168 from a non-contact input event (for example, a hovering event), the touch screen 190 may output different detection values (for example, different analog voltage or current values) for the touch event and the hovering event. Further, the touch screen 190 may output a different detection value (for example, a different current value) according to the distance between an area of a hovering event and the touch screen 190.

The touch screen 190 may be implemented as, for example, a resistive type, a capacitive type, an infrared type, or an acoustic wave type.

To receive an input of the user's body and an input of the input device 168 simultaneously or sequentially, the touch screen 190 may include at least two touch screen panels that sense touches or proximity of the user's body and the input device 168, respectively. The at least two touch screen panels provide different output values to the touch screen controller 195 and the touch screen controller 195 determines whether an input from the touch screen 190 is an input of the user's body or an input of the input device 168 by distinguishing values received from the at least two touch screen panels.

More specifically, the touch screen 190 may be configured by stacking a panel to sense an input of a finger or the input device 168 by a change in inducted power and a panel to sense contact of a finger or the input device 168 on the touch screen 190, in close contact with each other or partially apart from each other. This touch screen 190 includes a large number of pixels to display an image. The touch screen 190 may include at least one of a Liquid Crystal Display (LCD) panel, an Organic Light Emitting Diode (OLED) display, or an LED display.

The touch screen 190 includes a plurality of sensors to sense the position of a finger or the input device 168 that touches the touch screen 190 or is spaced from the touch screen 190 by a predetermined distance. Each of the sensors may have a coil structure. In a sensor layer formed by the plurality of sensors, each sensor has a predetermined pattern and a plurality of electrode lines are formed. Thus, when a finger or the input device 168 touches or hovers above the touch screen 190, a sensing signal having a changed waveform is generated due to the capacitance between the sensor layer and the input means. The touch screen 190 transmits the sensing signal to the controller 110. The distance between the input device 168 and the touch screen 190 may be determined based on the strength of a magnetic field formed by a coil, such as coil 510 of FIG. 5, of the input device 168.

The touch screen controller 195 converts an analog signal received from the touch screen 190 to a digital signal (X and Y coordinates) and transmits the digital signal to the controller 110. The controller 110 controls the touch screen 190 using the received digital signal. For example, the controller 110 may select or execute a shortcut icon or an object displayed on the touch screen 190 in response to a touch event or a hovering event. The touch screen controller 195 may be incorporated into the controller 110.

Further, the touch screen controller 195 determines the distance between a hovering input area and the touch screen 190 by detecting a value (for example, a current value) output from the touch screen 190, converts the distance to a digital signal (for example, a Z coordinate), and provides the digital signal to the controller 110.

Figure 2:
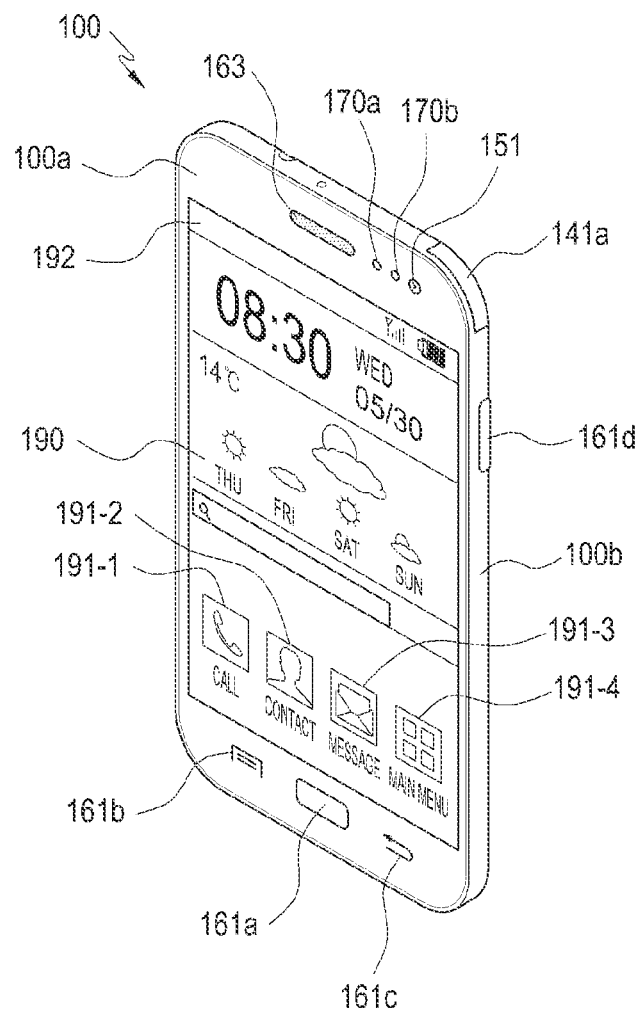
FIG. 2 is a front perspective view of a portable device according to an embodiment of the present invention.

FIGS. 2 and 3 are front and rear perspective views of a portable device respectively according to an embodiment of the present invention.

Referring to FIGS. 2 and 3, the touch screen 190 is disposed at the center of the front surface 100a of the portable device 100, occupying almost the entirety of the front surface 100a. In FIG. 2, a main home screen is displayed on the touch screen 190, by way of example. The main home screen is the first screen to be displayed on the touch screen 190, when the portable device 100 is powered on. In the case where the portable device 100 has different home screens of a plurality of pages, the main home screen may be the first of the home screens of the plurality of pages. Shortcut icons 191-1, 191-2 and 191-3 for executing frequently used applications, a main menu switch key 191-4, the time, the weather, and the like may be displayed on the home screen. A status bar 192 may be displayed at the top of the touch screen 190 in order to indicate states of the portable device 100 such as a battery charged state, a received signal strength, and a current time.

A home button 161a, a menu button 161b, and a back button 161c may be formed at the bottom of the touch screen 190.

The home button 161a is used to display the main home screen on the touch screen 190. For example, upon touching of the home button 161a while any home screen other than the main home screen or a menu screen is displayed on the touch screen 190, the main home screen may be displayed on the touch screen 190. Upon touching of the home button 161a during execution of applications on the home screen 190, the main home screen illustrated in FIG. 2 may be displayed on the touch screen 190. The home button 161a may also be used to display recently used applications or a task manager on the touch screen 190.

The menu button 161b provides link menus available on the touch screen 190. The link menus may include a widget adding menu, a background changing menu, a search menu, an edit menu, an environment setting menu, and the like.

The back button 161c is used to display a screen previous to a current screen or end the latest used application.

The first camera 151, an illumination sensor 170a, and a proximity sensor 170b may be arranged at a corner of the front surface 100a of the portable device 100, whereas the second camera 152, the flash 153, and the speaker 163 may be arranged on the rear surface 100c of the portable device 100.

A power/reset button 161d, a volume button 161e, including a volume up button 161f and a volume down button 161g, a terrestrial DMB antenna 141a for receiving a broadcast signal, and one or more microphones 162 may be disposed on side surfaces 100b of the portable device 100. The DMB antenna 141a may be mounted to the portable device 100 fixedly or detachably.

The connector 165 is formed on the bottom side surface of the portable device 100. The connector 165 includes a plurality of electrodes and may be connected to an external device by wire. The earphone connector jack 167 may be formed on the top side surface of the portable device 100, for allowing an earphone to be inserted. The earphone connector jack 167 may be formed on the top side surface of the portable device 100, for allowing an earphone to be inserted.

The input device 168 may be provided into the bottom side surface of the portable device 100. The input device 168 may be inserted and kept inside the portable device 100. When the input device 168 is used, the input device 168 is extended and detached from the portable device 100.

Figure 4:
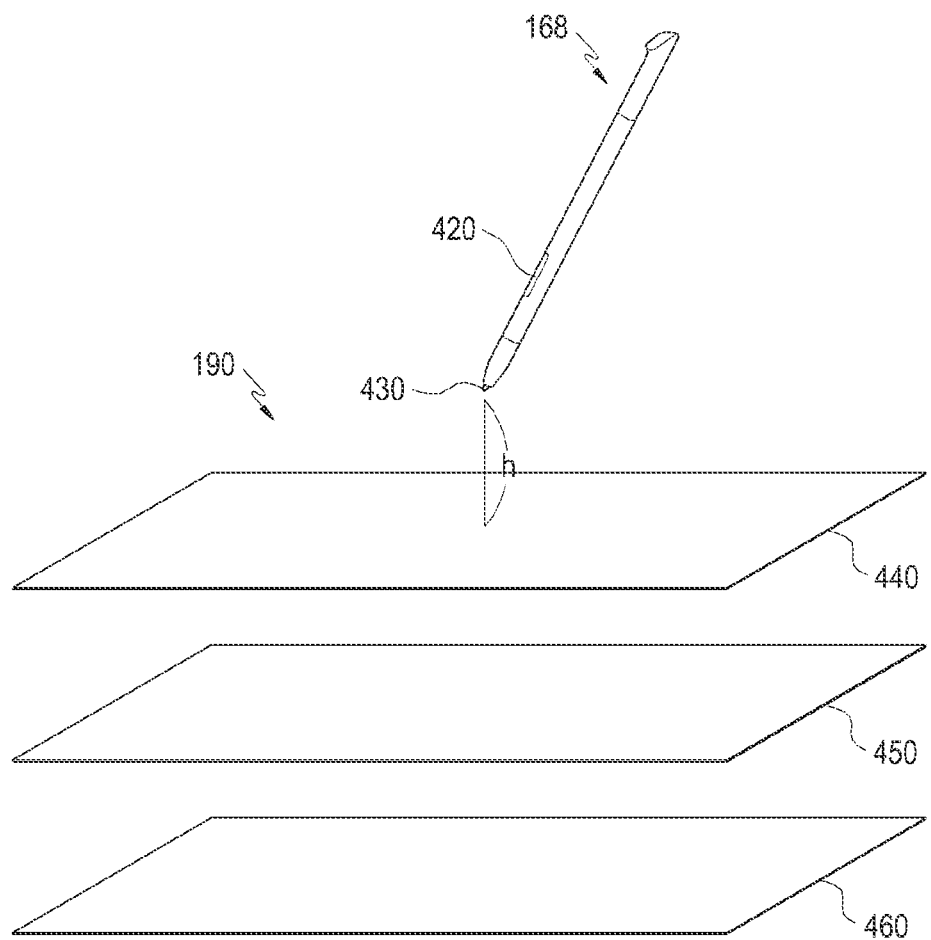
FIG. 4 illustrates an input unit for providing a vibration effect and an interior section of a touch screen according to an embodiment of the present invention.

FIG. 4 illustrates an input device for providing a vibration effect and an interior sectional view of a touch screen according to an embodiment of the present invention.

Referring to FIG. 4, the touch screen 190 includes a display panel 440, a first touch panel 450, and a second touch panel 460. The display panel 440 may be an LCD panel or an Active Matrix Organic Light Emitting Diode (AMOLED) panel, which displays various images according to the operation states of the portable device 100, application execution, services, and the like.

The first touch panel 450 is a capacitive touch panel formed by coating a thin metal material (for example, Indium Tin Oxide (ITO)) as a dielectric material on both surfaces of glass so that current may flow on the glass surfaces. When an input device (for example, a user's finger or a pen) touches a surface of the first touch panel 450, a certain amount of charge migrates to the touched position due to static electricity and the first touch panel 450 detects the touched position by sensing a variation in current caused by the charge migration. The first touch panel 450 is capable of sensing all touches that may generate static electricity and sensing all touches made by the input device, that is, a finger or pen.

The second touch panel 460 is an ElectroMagnetic Resonance (EMR) touch panel including an electromagnetic induction coil sensor (not shown) having a grid structure in which a plurality of loop coils are arranged in predetermined first and second directions which are perpendicular to each other, and an electromagnetic signal processor (not shown) for providing an alternating signal having a predetermined frequency sequentially to the loop coils of the electromagnetic induction coil sensor. When the input device 168 having a built-in resonant circuit is positioned in the vicinity of a loop coil of the second touch panel 460, a magnetic field output from the loop coil generates current based on mutual electromagnetic induction in the resonant circuit of the input device 168. Then, an induction field is generated from a coil 510 (see FIG. 5) of the resonant circuit in the input device 168 and the second touch panel 460 detects the induction field in loop coils placed in a reception state. Therefore, the second touch panel 460 senses either the hovering position or touched position of the input device 168 and the height h of a pen tip 430 of the input device 168 above the portable device 100. The height h may vary according to the capabilities or configuration of the portable device 100. The second touch panel 460 may sense the hovering and touch of any input means that can generate current based on electromagnetic induction.

In accordance with an embodiment of the present invention, it is assumed that the second touch panel 460 is dedicated to sensing the hovering or touch of the input device 168. The input device 168 may be referred to as an electromagnetic pen or an EMR pen. The input device 168 may have a different configuration from a general pen that does not include a resonant circuit, sensed by the first touch panel 450. The input device 168 may include a button 420 for changing an electromagnetic induction value generated by the coil inside the pen body in the vicinity of the pen tip 430. The input device 168 will be described later in detail with reference to FIG. 5.

The touch screen controller 195 may include a first touch panel controller and a second touch panel controller. The first touch panel controller converts an analog signal corresponding to a sensed finger touch or pen touch, received from the first touch panel 450 to a digital signal (for example, X, Y and Z coordinates) and provides the digital signal to the controller 110. The second touch panel controller converts an analog signal corresponding to the sensed hovering or touch of the input device 168 from the second touch panel 460 to a digital signal and provides the digital signal to the controller 110. The controller 110 controls the display panel 440, the first touch panel 450, and the second touch panel 460 using the digital signals received from the first and second touch panel controllers. For example, the controller 110 may display a predetermined screen on the display panel 440 in response to the finger touch or pen touch or in response to the hovering or touch of the input device 168.

In accordance with an embodiment of the present invention, therefore, the first touch panel 450 senses a user's finger touch or pen touch and the second touch panel 460 senses the hovering or touch of the input device 168 in the portable device 100. The controller 110 may distinguish the finger touch or pen touch from the hovering or touch of the input device 168. While only one touch screen is shown in FIG. 4, the present invention is not limited to a single touch screen and may have a plurality of touch screens. Each touch screen may be engaged with one housing by a hinge or a plurality of touch screens may be mounted in a single housing in the portable device 100. As illustrated in FIG. 4, each touch screen may include a display panel and at least one touch panel.

Figure 5:
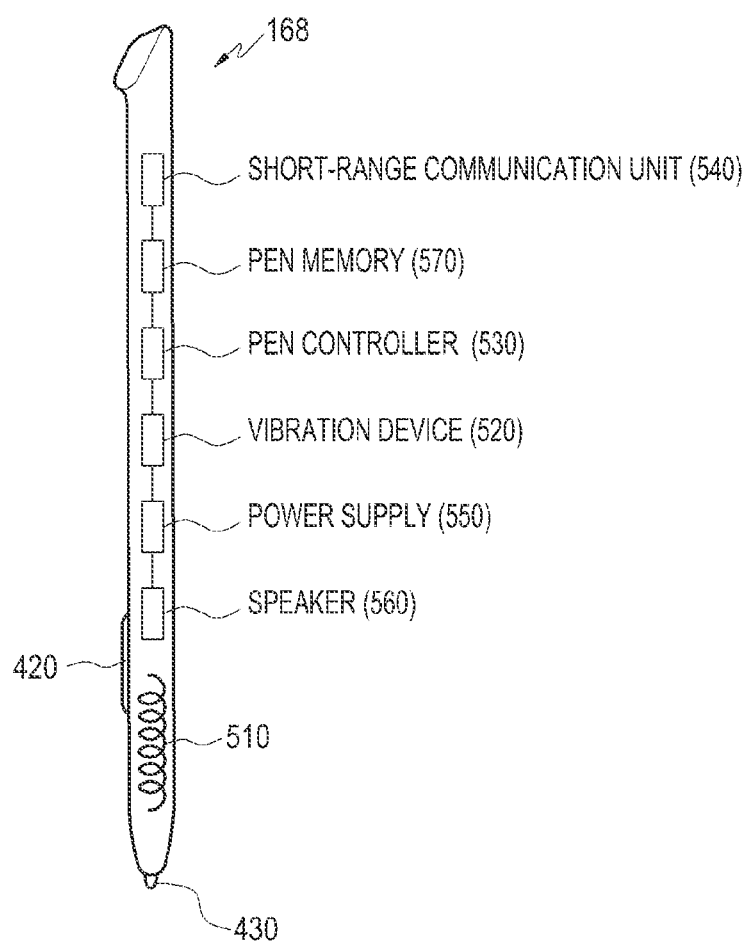
FIG. 5 is a block diagram of an input unit according to an embodiment of the present invention.

FIG. 5 is a block diagram of an input device according to an embodiment of the present invention. Referring to FIG. 5, the input device 168 may be connected to the portable device 100, another portable device, a portable phone, a smartphone, a tablet PC, and an external server through a short-range communication unit 540. The input device 168 may include a pen controller 530, the short-range communication unit 540, the coil 510, the pen tip 430, the pen button 420, a speaker 560, the vibration device 520, a pen memory 570, and a battery 550.

The pen controller 530 controls the short-range communication unit 540, the coil 510, the pen tip 430, the pen button 420, the speaker 560, the vibration device 520, the pen memory 570, and the battery 550. The pen controller 530 provides overall control to the input device 168, controls the components 520 to 560 of the input device 168, and performs a data processing function. If the pen tip 430 is located at a position (e.g. 20 mm or lower) where a touch on the touch screen or a hovering above the touch screen 190 may be detected, the pen controller 530 analyzes a control signal received from the portable device 100 through the short-range communication unit 540 and controls a vibration period and a vibration strength of the vibration device 520 of the input device 168 by a control signal. The pen controller 530 controls the battery 550 to supply power to the components.

In an embodiment of the present invention, if an object displayed on the portable device 100 is selected by touching the object or hovering above the object with the input device 168 and then the button 420 is pressed by the user, the pen controller 530 may control transmission of a copy command requesting copy of the object to a copy target through the short-range communication unit 540. The pen controller 530 controls reception of a part of copy information corresponding to the copy command from the portable device 100 through the short-range communication unit 540. The copy information may include object data corresponding to the copy target object, a file name, a file size, a file type, a file storing position, and a copy time. Further, the pen controller 530 may control reception of a part of copy information corresponding to the copy command from an external server through the short-range communication unit 540. One or more speakers 560 may be disposed in a housing of the input device 168.

The short-range communication unit 540 may include one of a WLAN module and a short-range communication module using a 2.4 GHz band. The short-range communication unit 540 may also include both the WLAN module and the short-range communication module. The short-range communication unit 540 may be connected to the portable device 100 and the external server under the control of the pen controller 530.

In an embodiment of the present invention, the short-range communication unit 540 may be paired with the portable device 100 having the short-range communication module 132 and thus transmits and receives control signals and data to and from the portable device 100. The short-range communication unit 540 receives a control signal from the portable device 100 and transmits the control signal to the pen controller 530. The short-range communication unit 540 analyzes a control signal received from the portable device 100. While the short-range communication unit 540 uses Bluetooth in the embodiment of the present invention, the short-range communication unit 540 may be replaced with or used together with a short-range communication unit that can establish a communication channel within a short range and transmit and receive a signal through the communication link by ZigBee, Ultra Wide Band (UWB), or Radio Frequency Identifier (RFID).

The coil 510 creates an induced magnetic field by interacting with a loop coil of the second touch panel 460 of the portable device 100. The portable device 100 receives the induced magnetic field generated from the coil 510 and detects a hovering position or touch position of the input device 168 and the height of the pen tip 430 of the input device 168 above the touch screen 190 based on the induced magnetic field.

When the user presses the pen button 420, the pen button 420 may change an electromagnetic induction value generated from the coil 510. The pen button 420 may include a physical button or a touch button.

The speaker 560 may output various sound sources stored in the pen memory 570 under the control of the pen controller 530. In an embodiment of the present invention, the speaker 560 outputs an auditory feedback corresponding to a control command received from the portable device 100 in response to a copy command generated from the button 420. The speaker 560 may output an auditory feedback corresponding to a control command received from the portable device 100 in response to a paste command generated from the button 420. In addition, the speaker 560 may output a sound corresponding to a vibration period and/or a vibration strength of the pen vibration device 520. The speaker 560 may output a sound corresponding a first control signal and/or a second control signal output from the input device 168, substantially simultaneously with sound output of the speaker 163 of the portable device 100 (for example, the time interval between sound outputs of the speakers 163 and 560 is 5 ms or shorter) or within a predetermined time (for example, 20 ms) after sound output of the speaker 163.

The vibration motor 520 converts an electrical signal to a mechanical vibration under the control of the pen controller 530.

In an embodiment of the present invention, the vibration device 520 may be activated in response to a control signal received from the portable device 100 and provide a tactile feedback to the user. The vibration device 520 may vibrate the whole or part of the input device 168.

The pen memory 570 stores input/output signals or data in correspondence with operations of the short-range communication unit 540, the coil 510, the pen button 420, the speaker 560, the vibration device 520, and the battery 550 under the control of the controller 530.

In an embodiment of the present invention, the pen memory 570 stores device information about the input device 168. For example, the device information may include a model name, a unique device ID, a remaining memory capacity, information about the presence or absence of object data, a Bluetooth version, or a Bluetooth profile. In addition, the pen memory 570 may store one or more vibration waveforms that vibrate the vibration device 520 based on a control signal received from the portable device 100.

The battery 550 supplies power to the components of the input device 168 under the control of the pen controller 530. If the remaining amount of the battery 550 is not sufficient, the battery 550 may be charged by a cable or wirelessly.

In an embodiment of the present invention, a control signal is received through the short-range communication unit 540 of the input device 168 under the control of the pen controller 530. The control signal is received from the portable device 100. The input device 168 may receive the control signal periodically for a predetermined time period or until hovering is terminated. The control signal may include, for example, at least one of information for activating vibration mode, information indicating a vibration strength of the input device 168, information for deactivating the vibration mode, and information indicating a total vibration time of the vibration device 520.

At least one component may be added to or removed from the components of the input device 168 illustrated in FIG. 5 according to the capabilities of the input device 168. It will be readily understood by those skilled in the art that the positions of the components may be changed according to the capabilities or configuration of the portable device 100.

Figure 6:
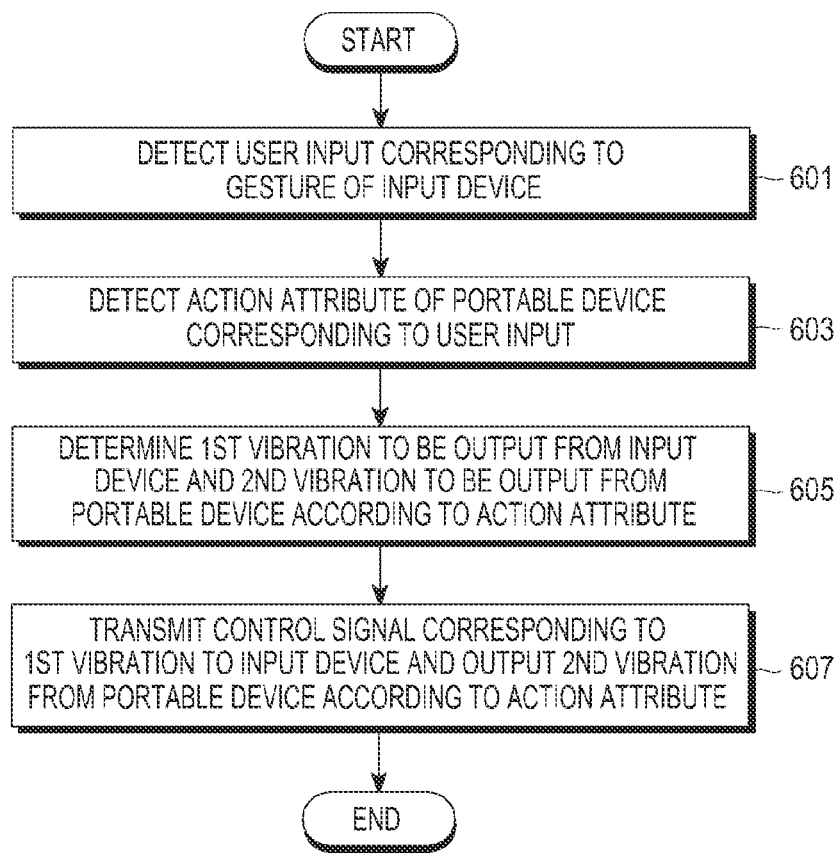
FIGS. 6, 7, and 8 are flowcharts illustrating operations of a portable device, upon execution of a game application, according to embodiments of the present invention.

An overall operation for generating vibration in the above-described portable device 100 and input device 168 according to the present invention will be described below with reference to FIG. 6. FIG. 6 is a flowchart illustrating an operation for generating vibration in the portable device 100 according to an embodiment of the present invention.

Referring to FIG. 6, the controller 110 of the portable device 100 detects a user input corresponding to a gesture made by the input device 168 in step 601. The user input corresponding to the gesture of the input device 168 may be a touch input or a hovering input.

In step 603, the controller 110 detects an action attribute of the portable device 100 corresponding to the user input. The action attribute may include information about an operation state of the portable device 100 at the moment the user input is generated. The action attribute may include information related to an application that is being executed in the portable device 100 at the moment the user input is generated. The action attribute may also include a command corresponding to the user input. The application information may include at least one of identification information about the ongoing application, information about a progress state of the application, and information about an object selected by the user input from among at least one object displayed on the touch screen 190 along with the progress of the application. The command corresponding to the user input may be determined according to the operation state of the portable device 100 or the ongoing application at the moment the user input is generated.

The controller 110 determines a first vibration to be output from the input device 168 and a second vibration to be output from the portable device 100 according to the action attribute in step 605. In addition, the controller 110 determines generation times of the first and second vibrations according to the action attribute.

In step 607, the controller 110 transmits a control signal corresponding to the first vibration to the input device 168 and controls output of the second vibration from the portable device 100 by controlling the vibration motor 164.

For example, the controller 110 controls generation of the first vibration from the input device 168 while the command corresponding to the user input is being executed, discontinues generation of the first vibration from the input device 168 upon completion of the command execution, and then controls generation of the second vibration from the portable device 100. The controller 110 may also control generation of the second vibration from the portable device 100 while the command corresponding to the user input is being executed, discontinue generation of the second vibration from the portable device 100 upon completion of the command execution, and then control generation of the first vibration from the input device 168. The controller 110 may further control simultaneous generation of the first vibration from the input device 168 and the second vibration from the portable device 100.

In another example, the controller 110 controls generation of the first vibration from the input device 168 as a feedback for the sensed user input and, upon completion of execution of the command corresponding to the user input, controls generation of the second vibration from the portable device 100 as a feedback for the completion of the command execution. The controller 110 may also control generation of the second vibration from the portable device 100 as a feedback for the sensed user input and, upon completion of execution of the command corresponding to the user input, may control generation of the first vibration from the input device 168 as a feedback for the completion of the command execution.

Figure 7:
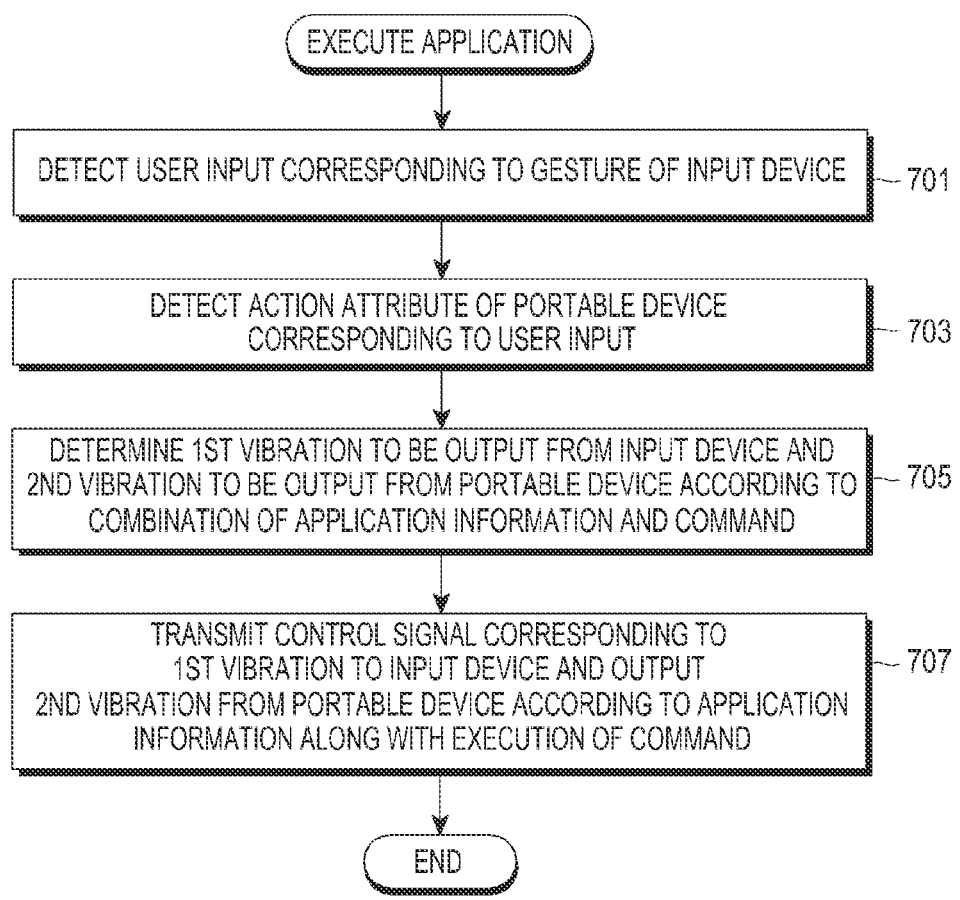

FIG. 7 is a flowchart illustrating an operation of the controller 110 during execution of an application according to another embodiment of the present invention.

Referring to FIG. 7, the controller 110 detects a user input corresponding to a gesture made by the input device 168 in step 701. In step 703, the controller 110 detects an application attribute including application information and a command that correspond to the user input. The controller 110 determines a first vibration to be output from the input device 168 and a second vibration to be output from the portable device 100 according to a combination of the application information and the command in step 705. Further, the controller 110 determines generation times of the first and second vibrations according to the combination of the application information and the command. Subsequently, the controller 110 transmits a control signal corresponding to the first vibration to the input device 168 and outputs the second vibration from the portable device 100 based on the application information along with execution of the command in step 707.

Now, examples of vibration control during execution of an application will be described below with reference to FIGS. 8 to 22B.

Figure 8:
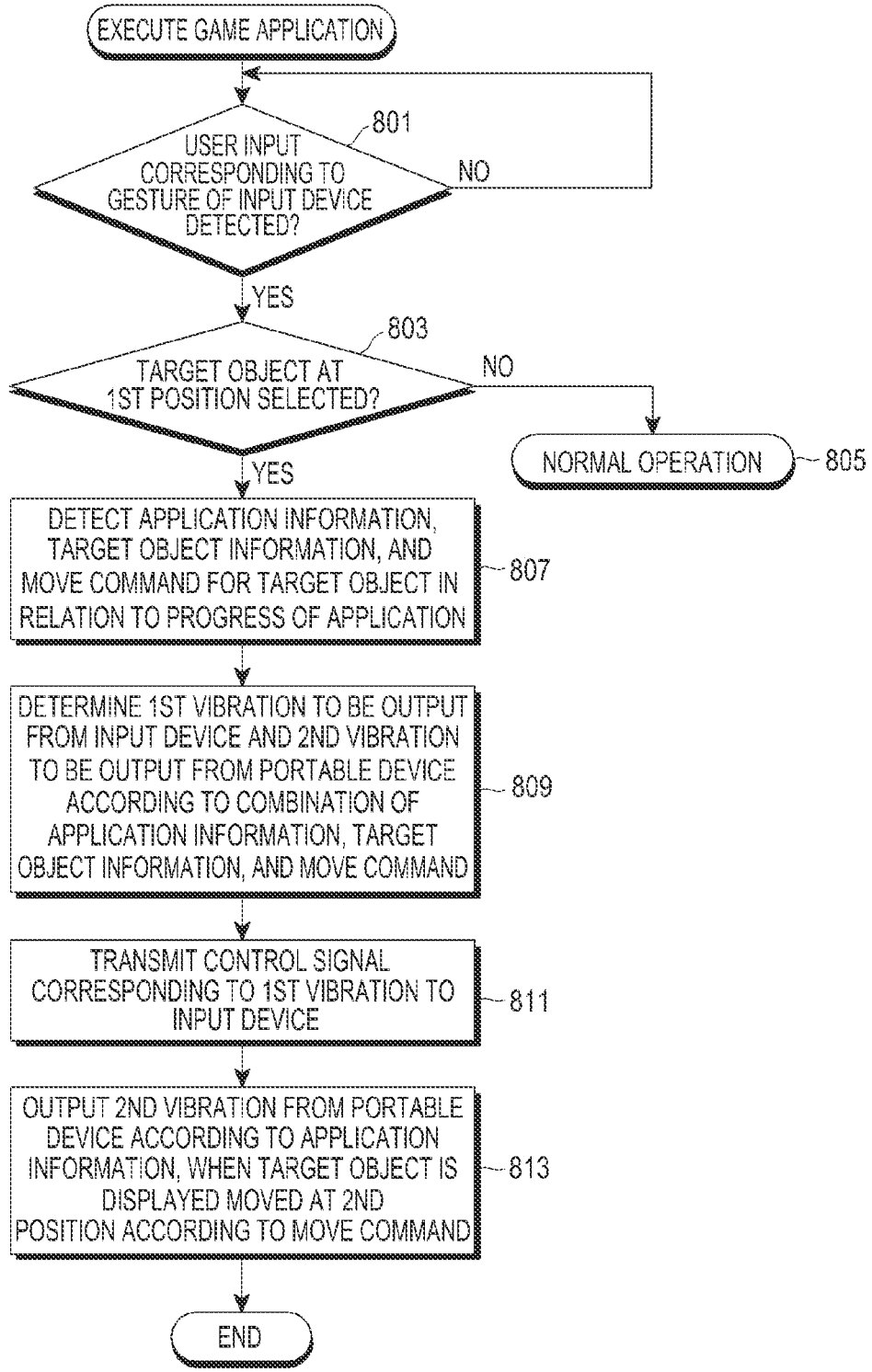
Figure 9A:
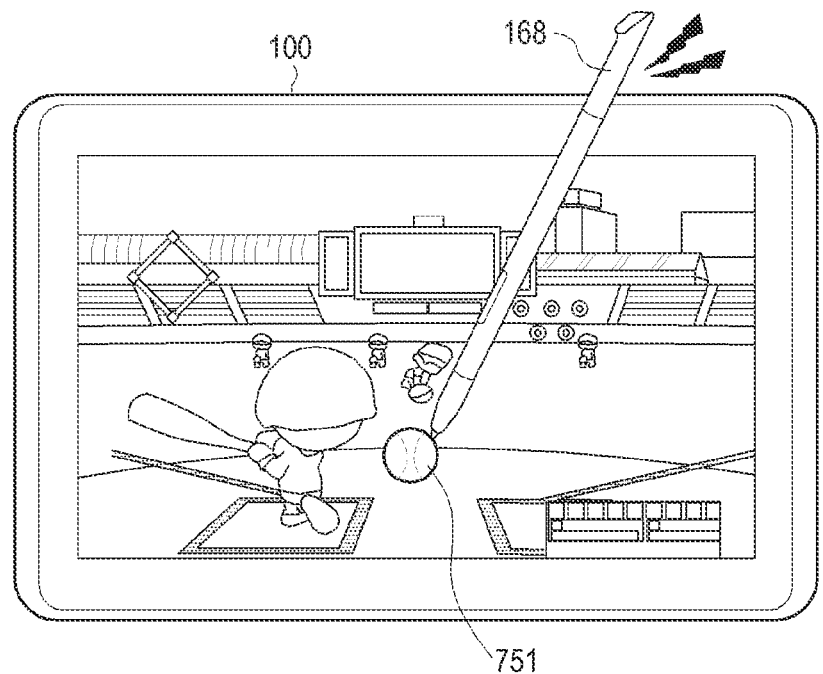
FIGS. 9A, 9B, 10A, 10B, 11A, 11B, and 12 illustrate execution screens of game applications according to embodiments of the present invention.
Figure 9B:
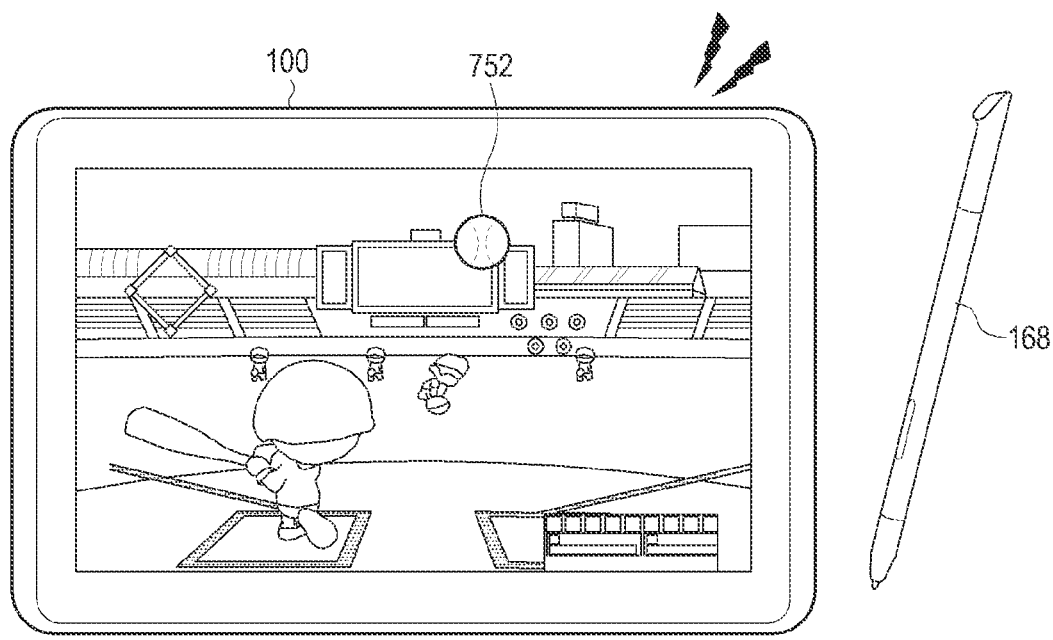
Figure 10A:
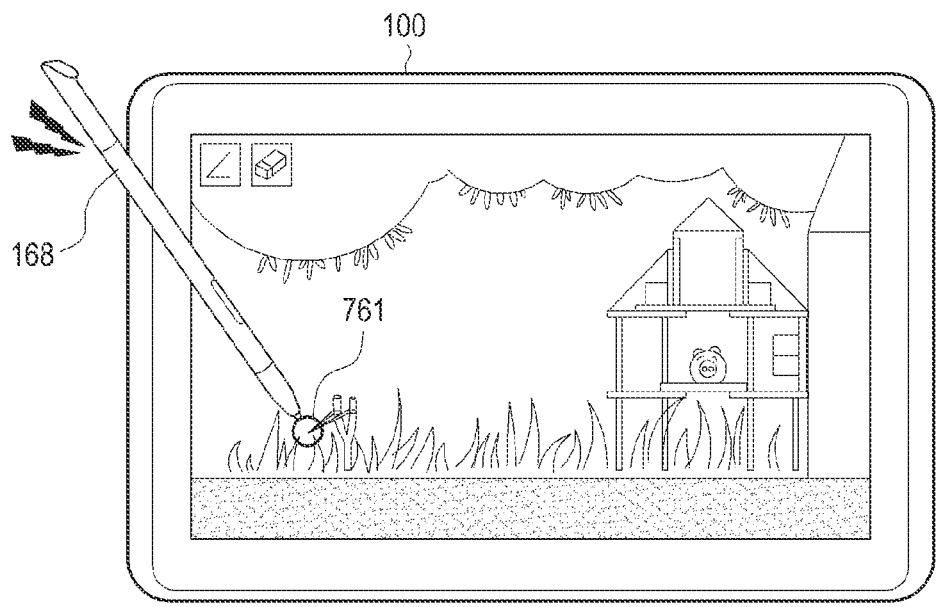
Figure 10B:
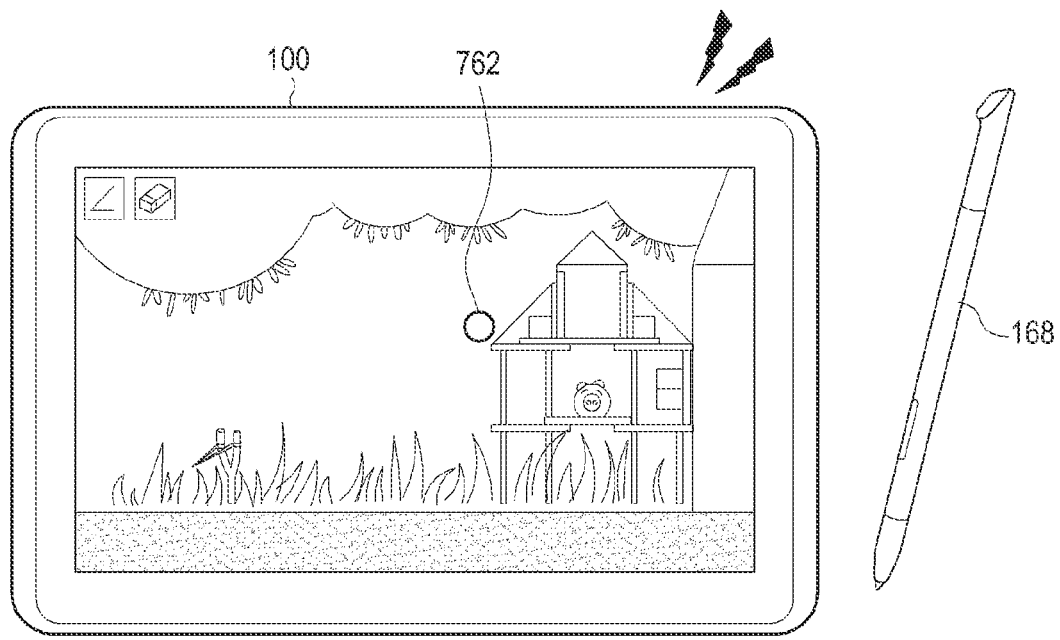
Figure 11A:
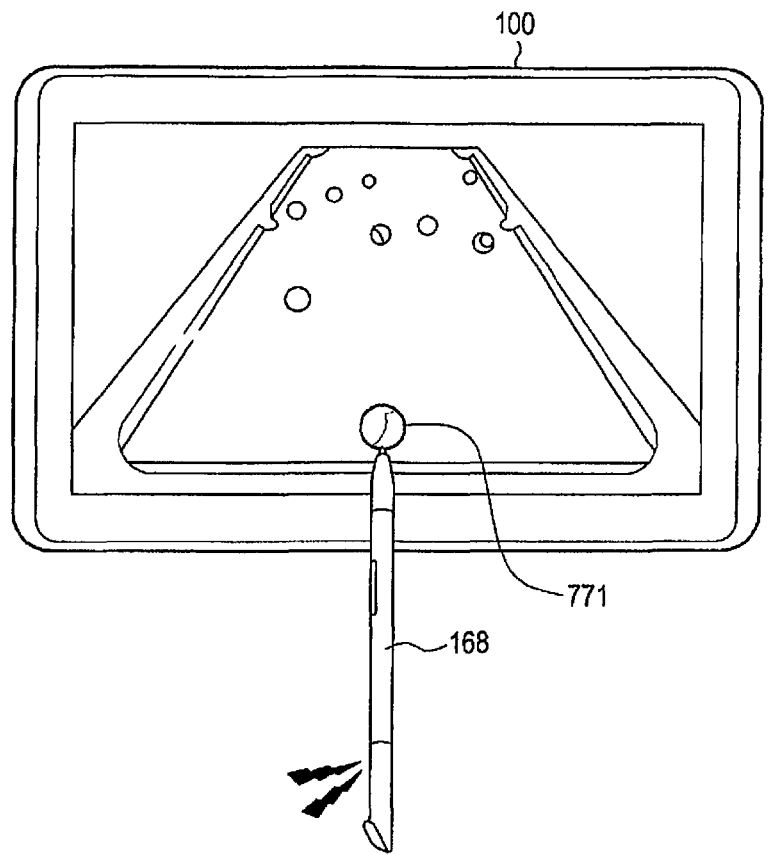
Figure 11B:
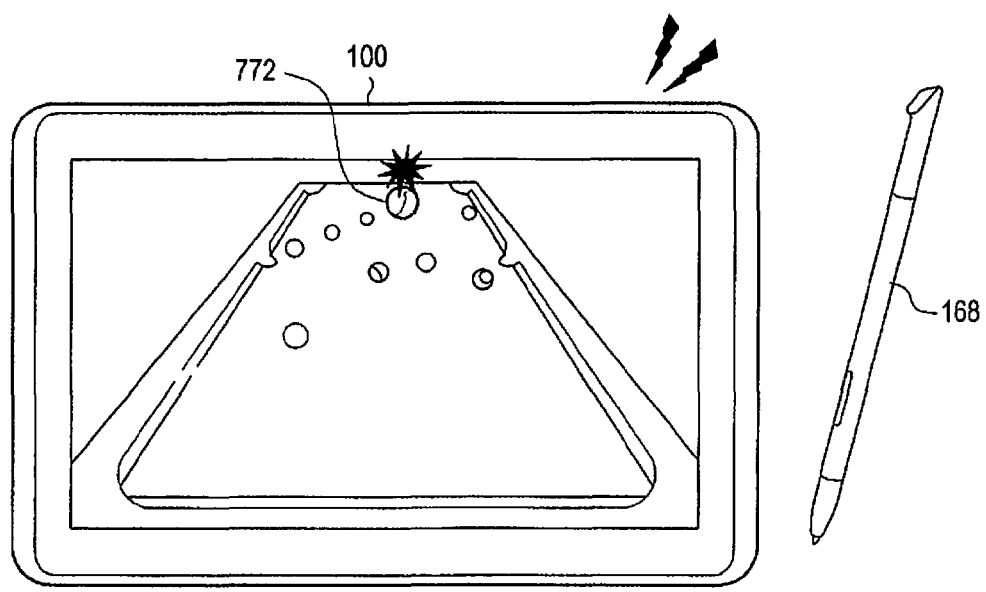
Figure 12:
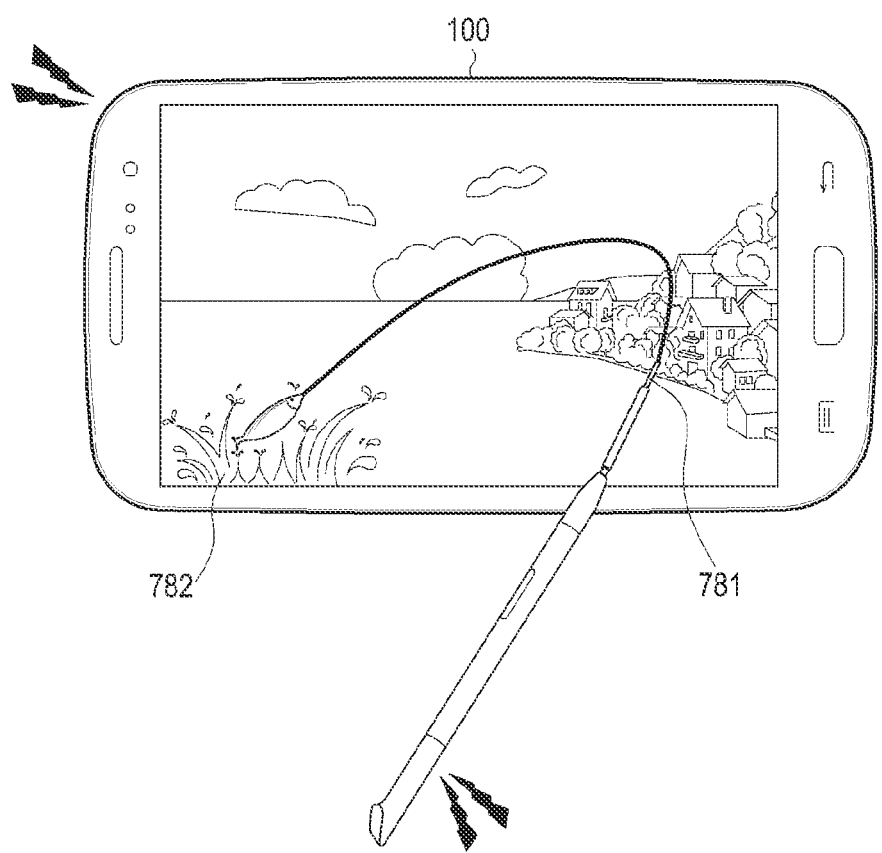

First, operations for controlling vibration during execution of a game application will be described with reference to FIGS. 8 to 12. FIG. 8 is a flowchart illustrating an operation for controlling vibration during execution of a game application in the portable device 100 according to an embodiment of the present invention. In the illustrated case of FIG. 8, it is assumed that a command to move a target object provided by the game application is detected. FIGS. 9A and 9B illustrate vibration generation during execution of a baseball game application, FIGS. 10A and 10B illustrate vibration generation during execution of a slingshot game application, FIGS. 11A and 11B illustrate vibration generation during execution of a billiards game application, and FIG. 12 illustrates vibration generation during execution of a fishing game application.

Upon execution of a game application, an image is displayed in real time along with the progress of the game application on the touch screen 190 of the portable device 100. The image may be selected by the input device 168 and may include at least one visual target object that can be manipulated. As the user selects and manipulates a target object using the input device 168, the game application may proceed.

For example, upon execution of the baseball game application, the portable device 100 displays a baseball game image as illustrated in FIG. 9A. The baseball game image may include a baseball 751 corresponding to a visual target object. The user may throw the baseball 751 as a pitcher or hit the baseball 751 as a hitter according to a game rule in the baseball game by manipulating the input device 168. In FIG. 9A, the user selects and manipulates the baseball 751 by playing the role of a hitter, by way of example.

Referring to FIG. 8, the controller 110 determines whether a user input corresponding to a gesture made by the input device 168 has been detected during execution of the game application in step 801. Upon detection of the user input, the controller 110 determines whether the user input is for selecting a target object at a first position in step 803. If the user input is for selecting the target object at the first position, the procedure goes to step 807 and otherwise, the procedure goes to step 805 to perform a normal operation of the portable device 100.

In step 807, the controller 110 detects application information, target object information, and a command to move the target object, in relation to execution of the game application at the moment the user input is generated.

For example, in FIG. 9A, the user, as a hitter, touches the baseball 751 using the input device 168 at an appropriate timing when the baseball 751 approaches home plate, to hit the baseball 751. Accordingly, the controller 110 senses that an input to select the baseball 751 has been generated at a position of the touch input. Then the controller 110 detects application information related to the progress state of the baseball game application at the moment the touch input is generated through the input device 168. Further, the controller 110 may determine a speed and direction of the baseball 751 according to the position and time of the touch input and detect object information including the determined speed and direction of the baseball 751. The controller 110 detects a move command corresponding to the touch input.

Referring to FIG. 8 again, the controller 110 determines a first vibration to be output from the input device 168 and a second vibration to be output from the portable device 100 according to a combination of the application information, the target object information, and the move command in step 809. The controller 110 transmits a control signal corresponding to the first vibration to the input device 168 in step 811 and outputs the second vibration through the portable device 100 when the target object is moved to a second position according to the move command in step 813.

In the example of FIG. 9A, the controller 110 determines the first vibration to be generated from the input device 168 to indicate that the user has selected the target object, according to the combination of the application information, the object information, and the move command that have been detected along with user selection of the baseball 751 at the first position corresponding to the target object by the input device 168. The controller 110 moves the baseball 751 according to the move command. The controller 110 determines the second vibration that is to be generated from the portable device when the baseball 751 is hit by the bat, such as when the baseball is put into play and bumps against a fence, flies over the fence, falls to the ground, or is caught by a defensive player as the result of the movement, that is, when the baseball 751 reaches the second position as the result of the movement. Subsequently, to provide a feedback for the selection of the baseball 751 to the user, the controller 110 transmits a control signal corresponding to the first vibration to the input device 168. Therefore, in FIG. 9A, the input device 168 receives the control signal and accordingly generates the first vibration. Next, referring to FIG. 9B, the controller 110 provides an image of a flying ball hit by the bat according to the move command and controls generation of the second vibration from the portable device 100 at the moment when the flying ball 751 bumps against an opposite score board (at the second position 752), as illustrated in FIG. 9B.

In the slingshot game application of FIGS. 10A and 10B, for example, upon generation of an input to select a stone 761 at a first position as a target object by the input device 168, the controller 110 controls generation of a first vibration from the input device 168 by transmitting a control signal corresponding to the first vibration to the input device 168, as illustrated in FIG. 10A. As illustrated in FIG. 10B, the controller 110 controls generation of a second vibration from the portable device 100 at the moment when the stone 762 launched from the sling-shot hits a target (at a second position).

In the billiards game application of FIGS. 11A and 11B, for example, upon generation of an input to select a ball 771 at a first position as a target object by the input device 168, the controller 110 controls generation of a first vibration from the input device 168 by transmitting a control signal corresponding to the first vibration to the input device 168, as illustrated in FIG. 11A. As illustrated in FIG. 11B, the controller 110 controls generation of a second vibration from the portable device 100 at the moment when the ball 772 rolls to a second position.

In another example, upon generation of a user input to select a first target object at a first position, the controller 110 transmits a control signal corresponding to a first vibration to the input device 168 and controls generation of a second vibration from the portable device 100, when a second target object is displayed at a second position.

Referring to FIG. 12, for example, upon execution of the fishing game application, an image of a fishing spot is displayed on the touch screen 190. When the user selects a fishing rod 781 at a first position by means of the input device 168, the controller 110 detects application information, object information such as a selection time, and selection strength of the fishing rod 781, and a catch command in relation to the progress of the fishing game application. The controller 110 determines a first vibration to be output from the input device and a second vibration to be output from the portable device 100 according to a combination of the detected information and command. To provide feedback for the selection of the fishing rod 781, the controller 110 transmits a control signal corresponding to the first vibration to the input device 168. Then the controller 110 provides an image of a fish being caught and controls generation of the second vibration from the portable device 100 at the moment when the caught fish corresponding to a second target object shows up above a water surface (a second position) 782.

Figure 13:
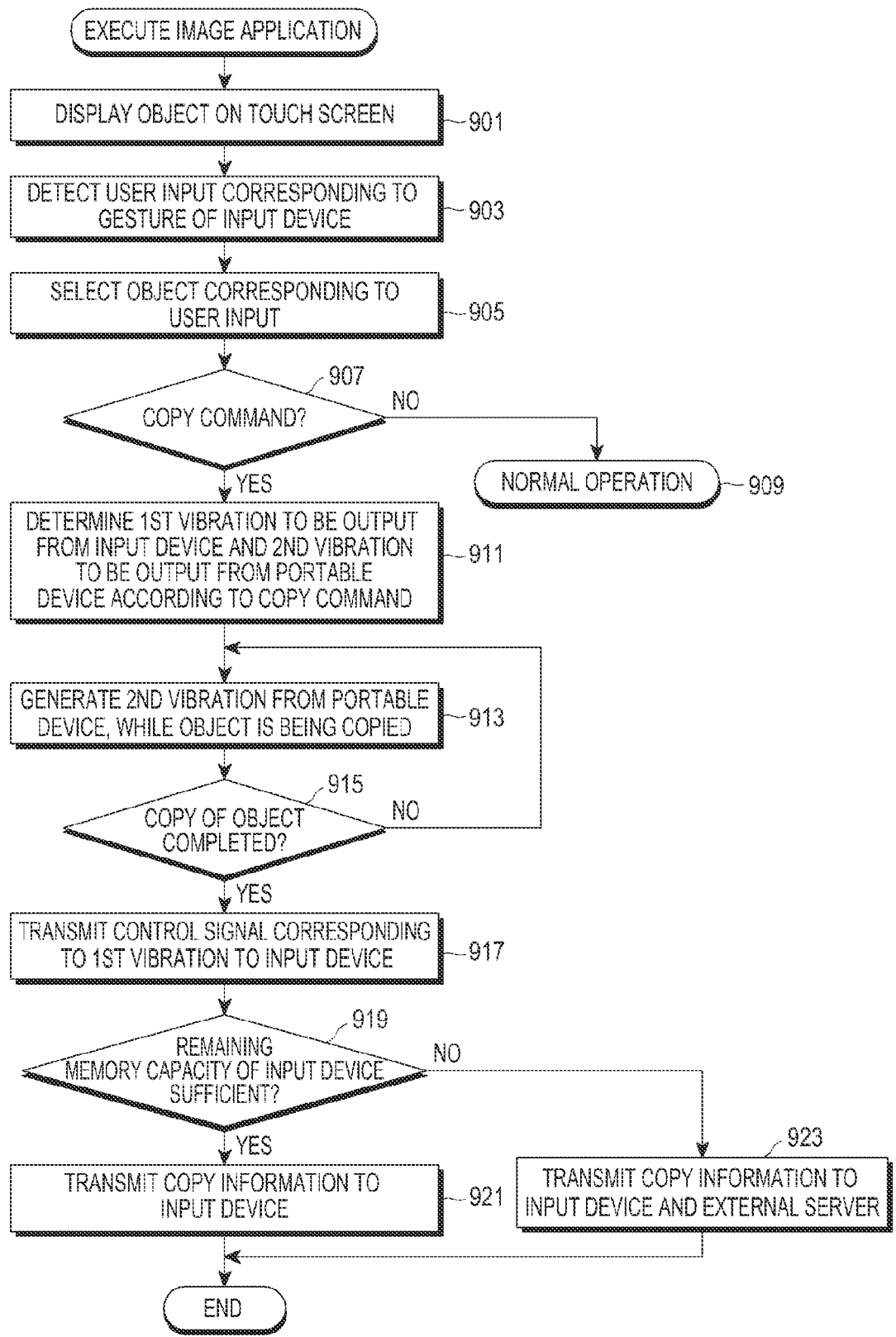
FIG. 13 is a flowchart illustrating an operation of a portable device upon execution of an image application according to an embodiment of the present invention.
Figure 14A:
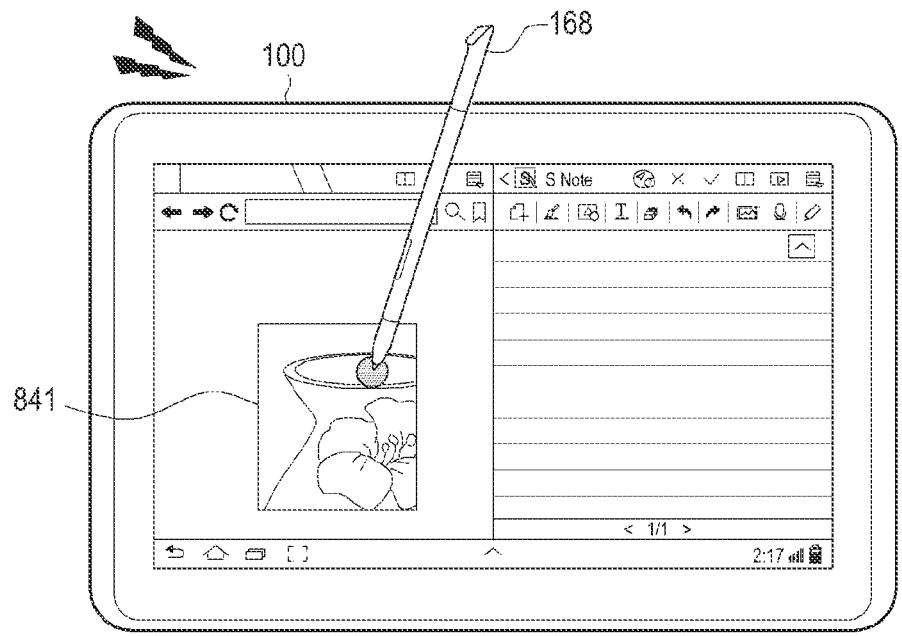
FIGS. 14A and 14B illustrate execution screens of an image application according to an embodiment of the present invention.
Figure 14B:
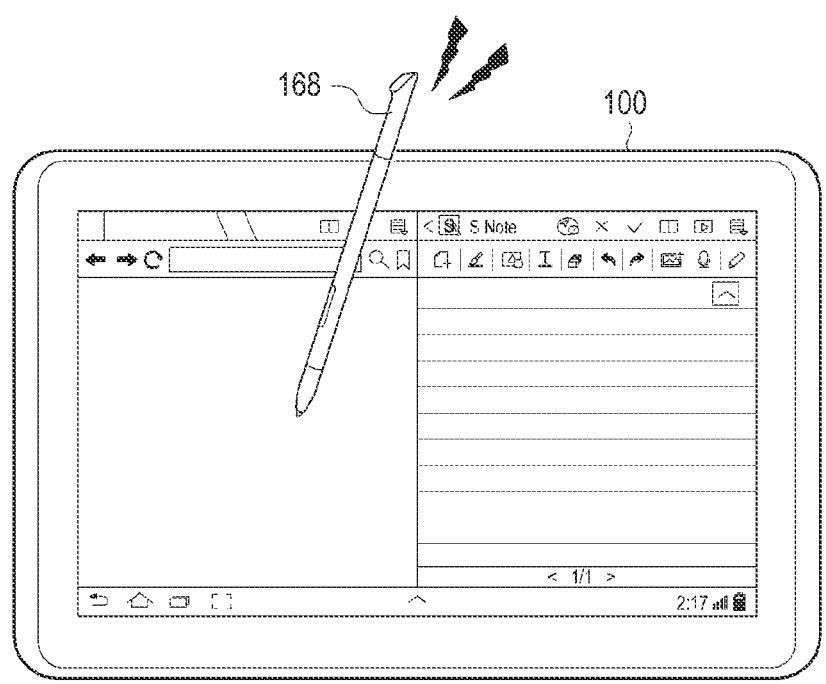
Figure 15:
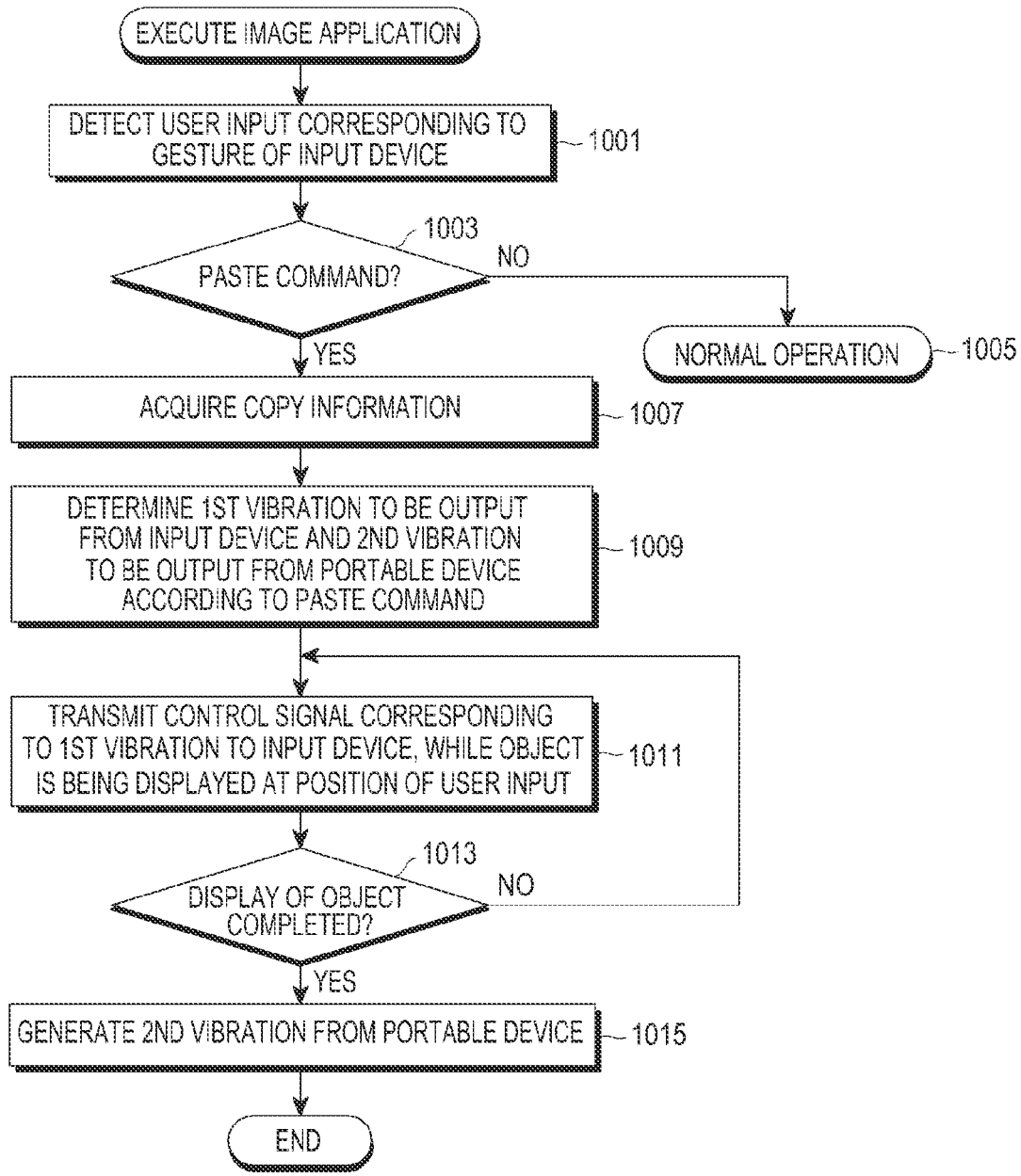
FIG. 15 is a flowchart illustrating an operation of a portable device upon execution of an image application according to an embodiment of the present invention.
Figure 16A:
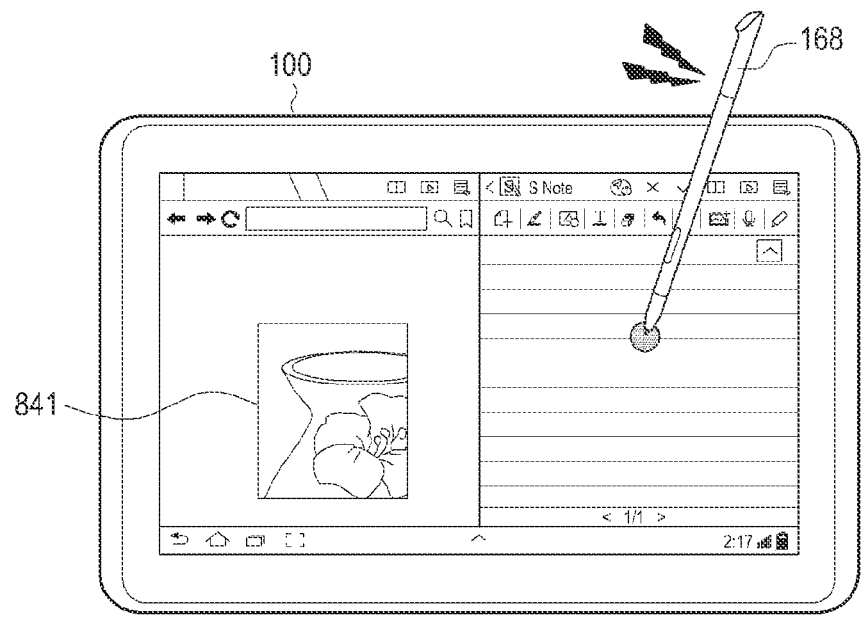
FIGS. 16A and 16B illustrate execution screens of an image application according to an embodiment of the present invention.
Figure 16B:
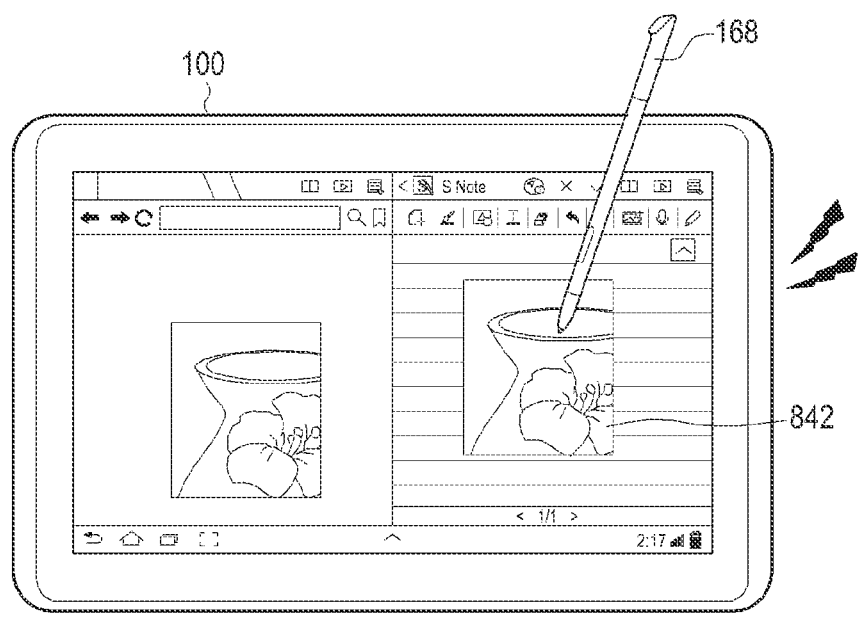
Figure 17:
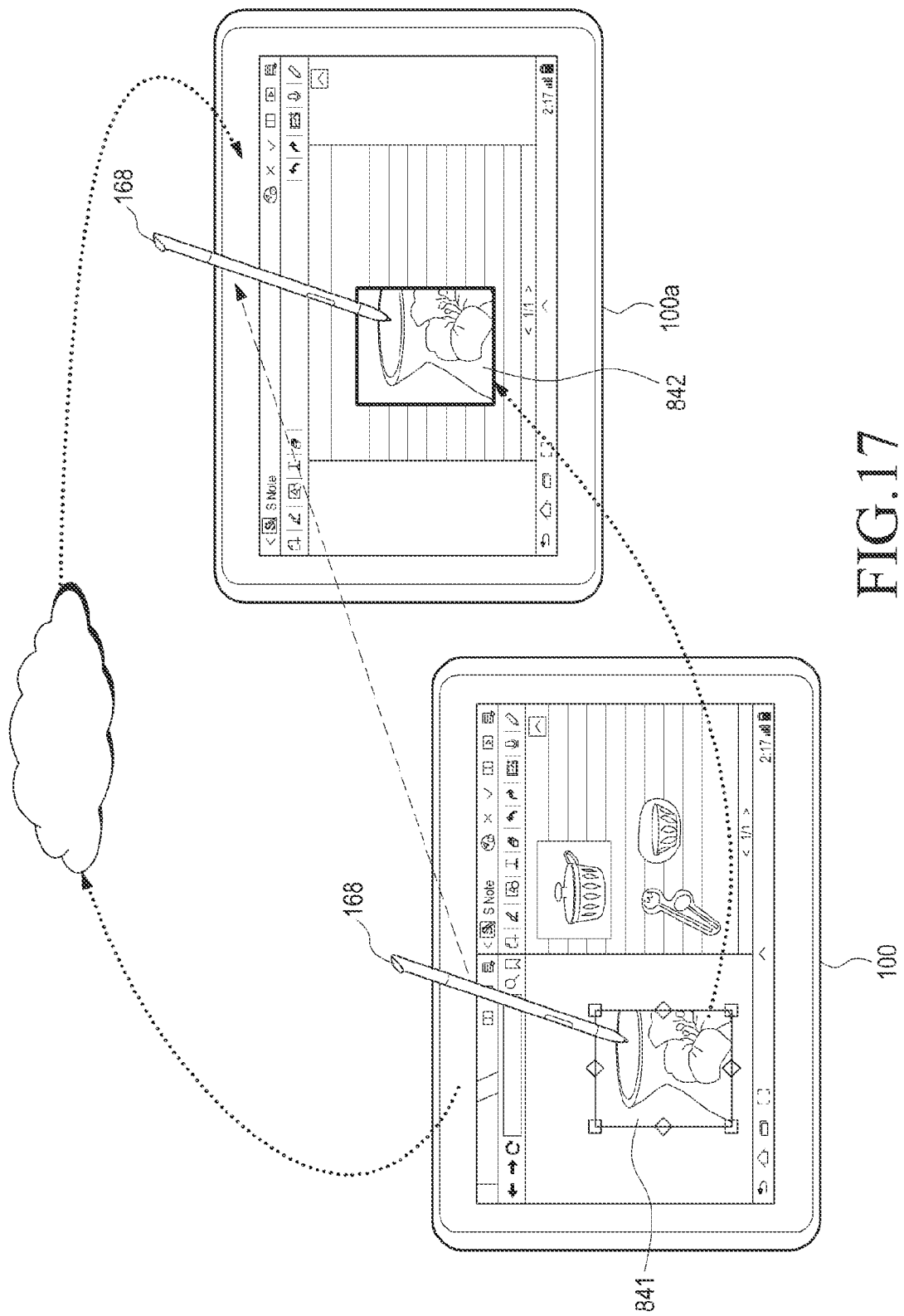
FIG. 17 illustrates a method for providing a feedback in a portable device according to an embodiment of the present invention.

With reference to FIGS. 13 to 17, a description will be given of an operation for controlling vibration in the process of copying an image object displayed on the touch screen 190 and pasting the copied image object during execution of an image application that allows image editing. FIG. 13 is a flowchart illustrating an operation of a portable device upon execution of an image application according to an embodiment of the present invention, and FIGS. 14A and 14B illustrate execution screens of an image application according to an embodiment of the present invention. FIG. 15 is a flowchart illustrating an operation of a portable device upon execution of an image application according to an embodiment of the present invention, and FIGS. 16A and 16B illustrate execution screens of an image application according to an embodiment of the present invention. FIG. 17 illustrates an exemplary method for providing a feedback in a portable device according to an embodiment of the present invention.

Referring to FIG. 13, upon execution of an image application, the controller 110 displays an object on the touch screen 190 in step 901. For example, an image object 841 is displayed as illustrated in FIG. 14A. The user may select the displayed image object 841 by touching the image object 841 using the input device 168. Accordingly, the controller 110 detects a user input corresponding to a gesture made by the input device 168 in step 903 and selects the image object displayed at a position of the user input in step 905. The user may enter a copy command to the portable device 100 by pressing the pen button 420 of the input device 168. The user also may touch the image object 841, while pressing the pen button, to thereby enter the copy command at the moment of touching the image object 841.

Therefore, the controller 110 detects whether the copy command is entered in step 907 and determines a first vibration to be output from the input device 168 and a second vibration to be output from the portable device 100 in response to the copy command in step 911. If the copy command is not entered in step 907, the controller performs a normal operation in step 909.

The controller 110 may map pre-stored device information about the input device 168, object information (for example, a file name, a file size, a file type, a file extension, a file stored position, or the like) about the selected object, and the copy command and may store the mapped information as copy information in a temporary storage area or clip board of the image application. The controller 110 may provide a visual feedback (for example, flash, a video, or the like) on the touch screen 190 or an auditory feedback (for example, a sound) through the speaker 163, in response to the object selection.

In step 913, the controller 110 controls generation of the second vibration from the portable device 100 while the selected object is being copied. To provide a visual feedback for the progress of copying the selected object, the controller 110 may display a visual effect of the image object being contracted gradually or a visual effect of the image object being sucked into a pipette.

Upon completion of copying of the selected object in step 915, the controller 110 transmits a control signal corresponding to the first vibration to the input device 168 so as to generate the first vibration from the input device 168 in step 917. Upon completion of copying of the selected object 841, the copied image object 841 may no longer be displayed in the portable device 100 as illustrated in FIG. 14B. In another embodiment of the present invention, the copied image object 841 may still be displayed.

In step 919, the controller 110 determines whether the remaining capacity of the pen memory 570 of the input device 168 is sufficient. The controller 110 may compare the remaining capacity of the pen memory 570 of the input device 168 with a file size included in the object information about the copied object using the pre-stored device information about the input device 168. The controller 110 may transmit one of the copy information including the image object and copy information except for object data of the object to the input device 168 according to the comparison result.

If the remaining capacity of the pen memory 570 is larger than the file size of the image object, the controller 110 controls transmission of the copy information including the image object to the input device 168 in step 921. The copy information may include the object data, the file name, the file size, the file type, the file stored position, a copy time, and the like.

On the other hand, if the remaining capacity of the pen memory 570 is smaller than the file size of the image object in step 919, the controller 110 may not transmit the copy information including the image object to the input device 168. Therefore, in step 923 the controller 110 controls transmission of the object data to an external server using a Universal Resource Locator (URL) of the external server of a manufacturer stored in the memory 175 through the mobile communication module 120 or the sub-communication module 130. The controller 110 may map the URL of the external server to the copy information and store the mapped information in the memory 175. In other words, the controller 110 transmits the copy information including the object data to the external server and transmits copy information that includes the URL of the external server, without the object data to the input device 168.

FIG. 15 illustrates an operation for pasting the copied object. During the application in progress, the controller 110 detects a user input corresponding to a gesture made by the input device 168 in step 1001 and determines whether a paste command has been detected in step 1003. If the paste command is not detected in step 1003, the controller 110 performs a normal operation in step 1005.

Referring to FIG. 16A, the user may select a paste position by touching an area other than the image object 841 on a screen provided by the image application using the input device 168. Thereafter, the controller 110 detects the user input corresponding to the gesture of the input device 168 in step 1001. Then the user may enter the paste command to the portable device 100 by pressing the pen button 420 of the input device 168. Otherwise, to enter the paste command at the moment of touching an area other than the image object, the user may touch the area other than the image object, while pressing the pen button 420.

Upon detection of the paste command, the controller 110 acquires the copy information in step 1007. The copy information may be acquired from the input device 168 or the external server. That is, the controller 110 may receive the copy information stored in the procedure of FIG. 13 from the input device 168 by short-range communication. If the copy information stored in the pen memory 570 of the input device 168 includes the object data of the image object, the controller 110 displays the received object data in step 1011 as described below. On the other hand, if the copy information acquired from the pen memory 570 of the input device 168 includes the URL of the external server at which the object data is stored, the controller 110 may acquire the object data of the image object from the external server.

In step 1009, the controller 110 determines a first vibration to be output from the input device 168 and a second vibration to be output from the portable device 100 according to the paste command.

While the image object is being displayed at the position of the user input, the controller 110 transmits a control signal corresponding to the first vibration to the input device 168 in step 1011. To provide a visual feedback for the pasting of the image object, the controller 110 may display the image object gradually increasing in size. The controller 110 also may display the image object in the form of liquid dropping from a pipette.

The controller 110 then determines if the display of the image object is complete in step 1013. Upon completion of displaying of the image object in step 1013, the controller 110 controls generation of the second vibration from the portable device 100 in step 1015, as illustrated in FIG. 16B.

In an embodiment of the present invention, the copy and paste functions may be executed between a plurality of portable devices, as illustrated in FIG. 17. Referring to FIG. 17, a plurality of portable devices 100 and 100a may provide feedback for copy and paste using the input device 168. If the remaining memory capacity of the input device 168 is sufficient, the controller 110 of the first portable device 100 transmits control information for the object 841 selected by the input unit 168 and copy information including the object data of the object 841 to the input device 168 by short-range communication, for example, Bluetooth Serial Port Profile (SPP). A controller of the second portable device 100a may be aware that the input device 168 has the copy information by discovery and pairing with the input device 168. The controller of the second portable device 100a receives the control information and the copy information according to a paste command from the input device 168 by Bluetooth SPP.

If the remaining memory capacity of the input device 168 is not sufficient, the controller of the first portable device 100 transmits the control information for the object 841 selected by the input unit 168 and copy information except for the object data to the input device 168 by Bluetooth SPP. The controller 110 of the first portable device 100 may transmit the object data to an external server through the mobile communication module 120 or sub-communication module 130. In addition, the controller of the first portable device 100 may transmit the object data to the second portable device 100a through the mobile communication module 120 or sub-communication module 130.

The controller of the second portable device 100a may be aware that the input device 168 has the control information and the copy information by discovery and pairing with the input device 168. The controller of the second portable device 100a receives the control information and the copy information according to a paste command from the input device 168 by Bluetooth SPP. The controller of the second portable device 100a receives the object data from the external server through a communication module. The controller of the second portable device 100a also may receive the object data from the first portable device 100 through the communication module.

Vibrations are generated in the same manner for one or more portable devices, and thus a vibration generation method for a plurality of portable devices will not be provided herein to avoid redundancy.

Figure 18:
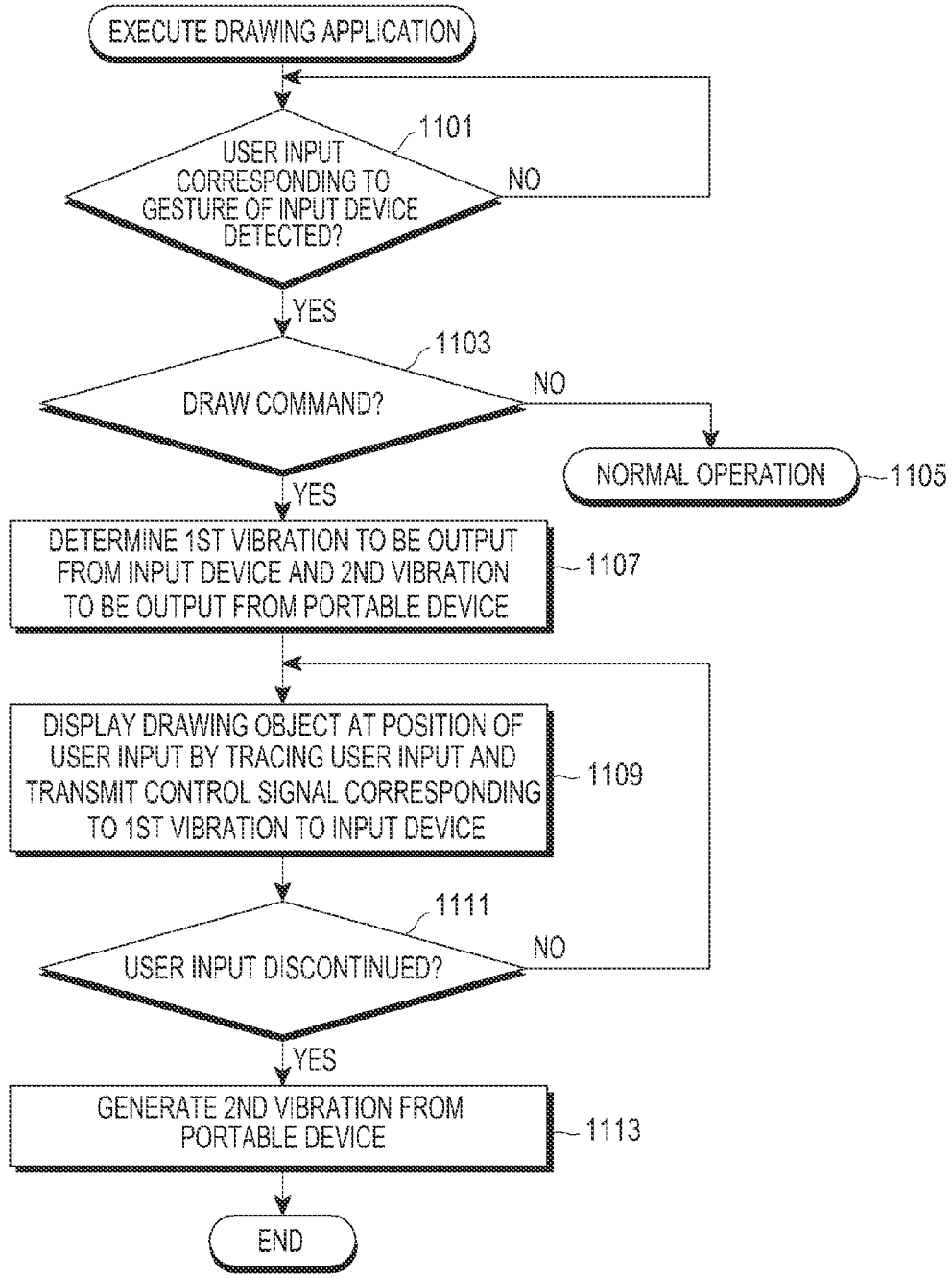
FIGS. 18 and 19 are flowcharts illustrating operations of a portable device upon execution of a drawing application according to embodiments of the present invention.
Figure 19:
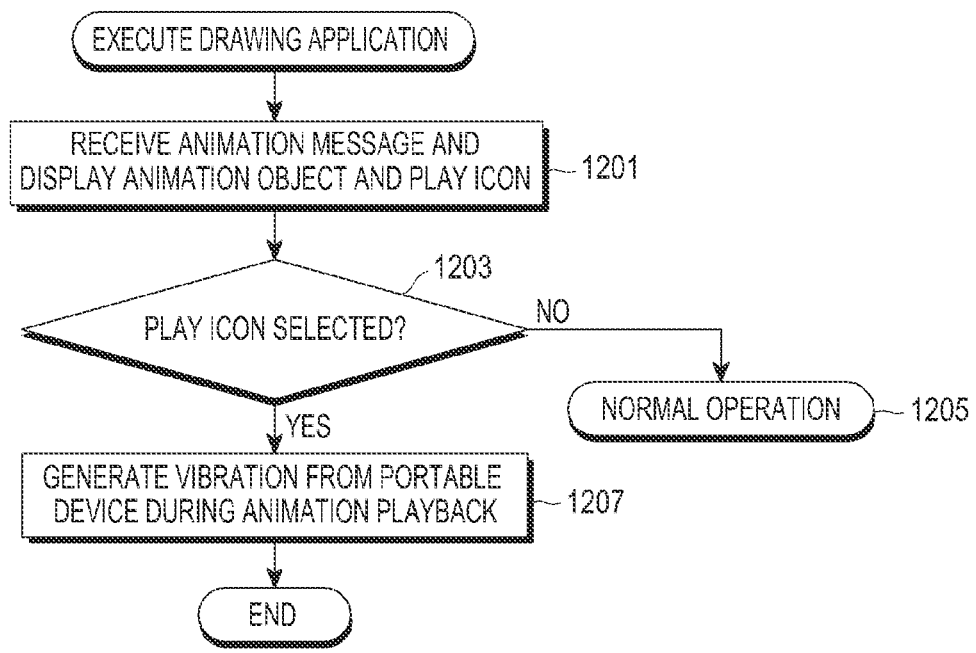
Figures 20A, 20B:
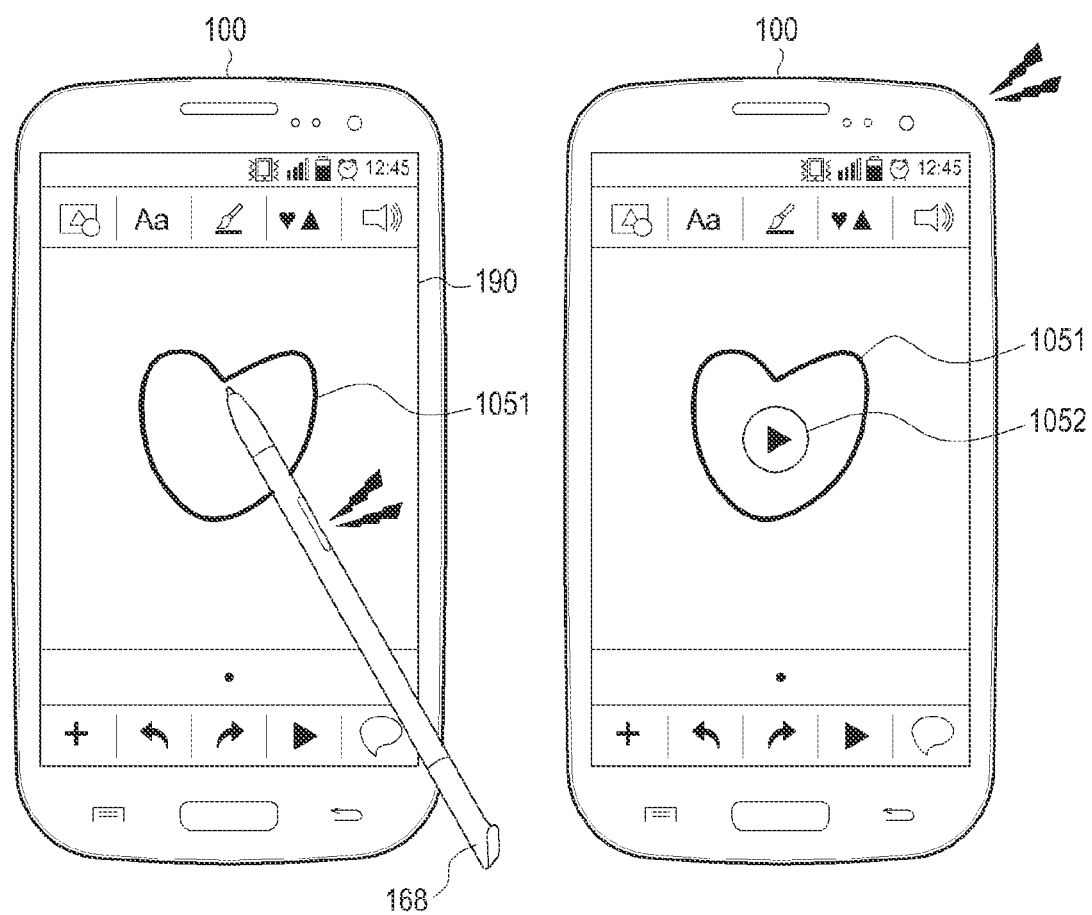
FIGS. 20A and 20B illustrate execution screens of a drawing application according to an embodiment of the present invention.

With reference to FIGS. 18 to 20B, an example of generating vibrations during execution of a drawing application will be described. The drawing application refers to an application that enables a user to draw using the input device 168. FIGS. 18 and 19 are flowcharts illustrating operations of a portable device during execution of a drawing application according to embodiments of the present invention. FIGS. 20A and 20B illustrate screens displayed along with execution of a drawing application according to an embodiment of the present invention.

Upon execution of the drawing application, the portable device 100 provides a layer on which the user may draw using the input device 168. Then the portable device 100 displays a drawing object in real time at a position of a user input by tracing the user input applied by the input device 168. Thus, a trajectory drawn by the user input is displayed.

Referring to FIG. 18, during execution of a drawing application, the controller 110 determines whether a user input corresponding to a gesture made by the input device 168 has been detected in step 1101. Upon generation of the user input, the controller 110 detects whether a draw command is input in step 1103. If a draw command is input, the controller 110 determines a first vibration to be output from the input device 168 and a second vibration to be output from the portable device 100 in step 1107. If a draw command is not input in step 1103, the controller 110 performs a normal operation in step 1105. In step 1109, the controller 110 displays a drawing object at the position of a continuous user input by tracing the continuous user input and transmits a control signal corresponding to the first vibration to the input device 168.

Referring to FIG. 20A, if the user draws a heart shape using the input device 168, the heart-shaped drawing object is displayed in real time on the touch screen 190. While the drawing object is being displayed, the input device 168 generates the first vibration.

Referring to FIG. 18 again, if the user input is discontinued in step 1111, the controller 110 controls generation of the second vibration from the portable device 100 in step 1113. If the user input continues in step 1111, the controller 110 maintains step 1109.

The drawing object created in the above operation may be stored as an animation object. An animation object is generated by storing the process of drawing and displaying an object in correspondence with a user input as a flash file or a video file. For example, as the user draws a heart using the input device 168, the process of drawing and displaying the heart on the touch screen 190 may be stored as a flash file or a video file. This is called an animation object.

The animation object may be transmitted in a message to another portable device. Upon receipt of the animation object, the portable device plays back the animation object. That is, the animation object corresponding to the heart-shaped drawing object may be included in a message and transmitted to another portable device and the portable device plays back the animation object upon user selection.

FIG. 19 is a flowchart illustrating an operation for receiving a message including an animation object and playing back the animation object. Referring to FIG. 19, with a drawing application executed, upon receipt of an animation message, the controller 110 displays an animation object and a play icon in step 1201. For example, a heart-shaped animation object 1051 and a play icon 1052 may be displayed as illustrated in FIG. 20B.

Upon generation of an input to select the play icon by the user in step 1203, the controller 110 displays the process of drawing the object by playing back the animation object in animation and outputs vibration in the portable device 100 during playback of the animation in step 1207. If the play icon is not selected, the controller 110 performs a normal operation in step 1205.

In FIG. 20B, for example, if the heart-shaped animation object 1051 is displayed and then an input to select the play icon 1052 is generated by the user, a visual effect of drawing the heart-shaped object is displayed. The portable device 100 outputs vibration until the heart-shaped object is completely drawn.

Figure 21:
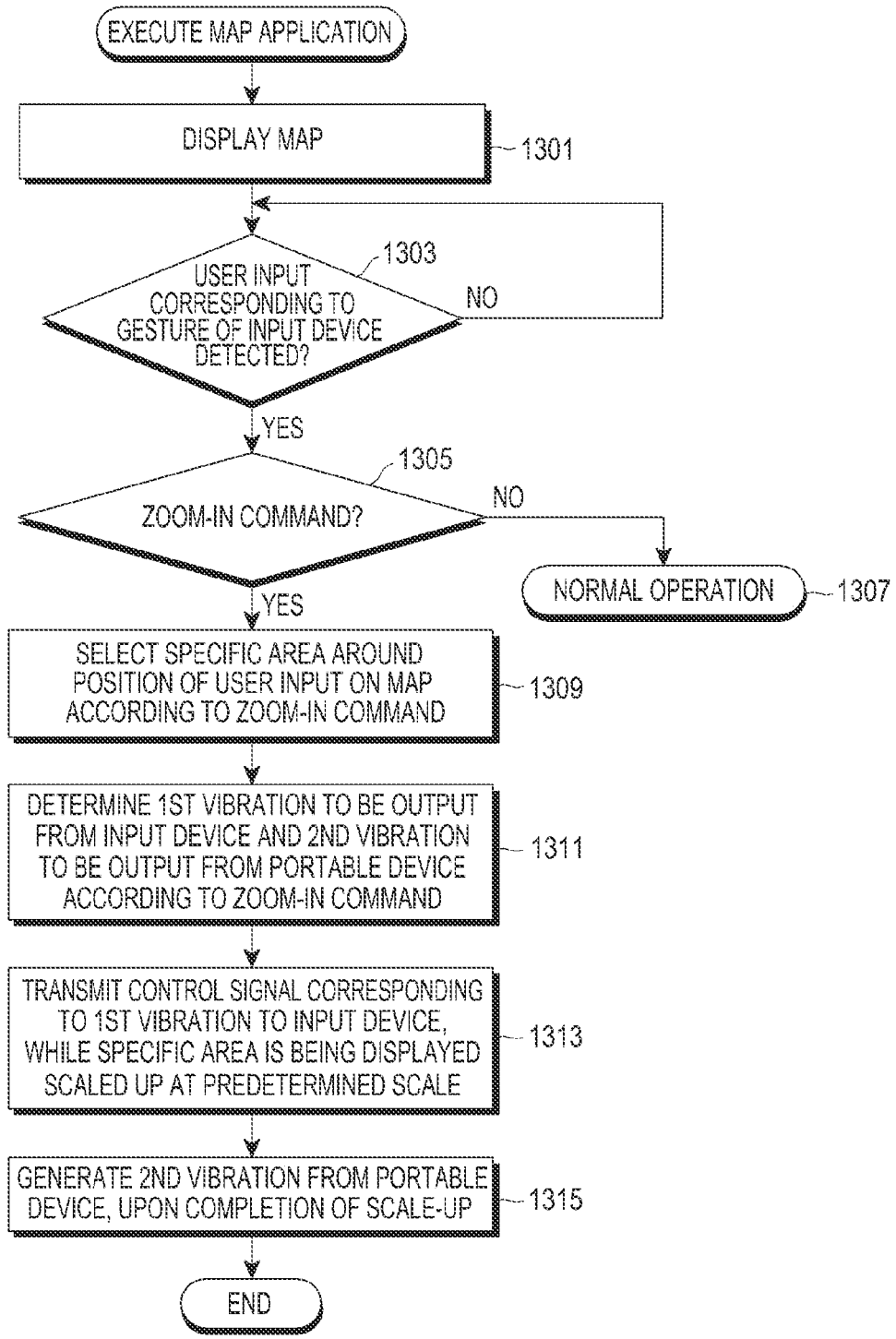
FIG. 21 is a flowchart illustrating an operation of a portable device upon execution of a map application according to an embodiment of the present invention.
Figure 22A:
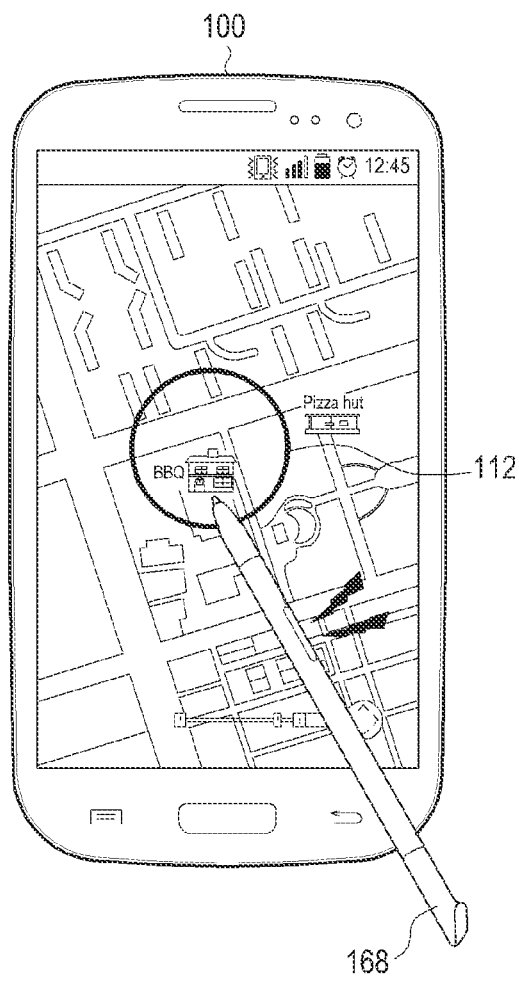
FIGS. 22A and 22B illustrate execution screens of a map application according to an embodiment of the present invention.
Figure 22B:
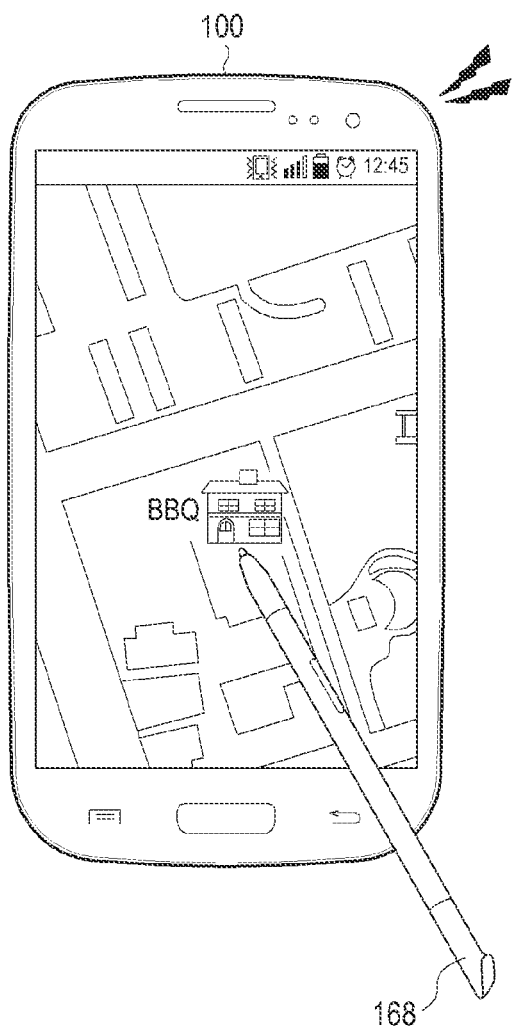

With reference to FIGS. 21, 22A, and 22B, vibration generation during execution of a map application will be described. FIG. 21 is a flowchart illustrating an operation of a portable device upon execution of a map application according to an embodiment of the present invention, and FIGS. 22A and 22B illustrate execution screens of a map application according to an embodiment of the present invention.

Upon execution of the map application, the portable device 100 displays a map on the touch screen 190 in step 1301. For example, a map may be displayed as illustrated in FIG. 22A. The user may select a point on the map and scale up or down the map to enlarge a specific area around the selected point or view a larger area around the selected point. In an embodiment of the present invention, a zoom-in command to enlarge a partial area of a map or a zoom-out command to display a larger area on the map by contracting a displayed area of the map may be input through the input device 168. For example, if the user selects an intended point for enlargement on a displayed map using the input device 168 and presses the button 420 of the input device 168 once, it may be determined that a zoom-in command has been generated. If the user selects an intended point on the displayed map using the input device 168 and presses the button 420 of the input device 168 twice, it may be determined that a zoom-out command has been generated. FIG. 21 illustrates an operation of the portable device 100, when a zoom-in command is input.

Referring to FIG. 22A, the user may touch an intended position for enlargement on a displayed map with the input device 168 or may hover the input unit 168 above the intended position for enlargement.

Referring to FIG. 21 again, the controller 110 detects a user input corresponding to a gesture made by the input device 168 in step 1303. The user may provide a zoom-in command to the portable device 100 by pressing the pen button 420 of the input device 168. To provide the zoom-in command at the moment of touching the map, the user also may touch the map, while pressing the pen button 420.

Thus, upon detection of the zoom-in command in step 1305, the controller 110 selects a specific area around the position of the user input on the map according to the zoom-in command in step 1309. The size of the area may be predetermined. For example, an enlarged area 1121 may be displayed as illustrated in FIG. 22A. If the zoom-in command is not detected in step 1305, the controller 110 performs a normal operation in step 1307.

In step 1311, the controller 110 determines a first vibration to be output from the input device 168 and a second vibration to be output from the portable device 100 according to the zoom-in command. Further, the controller 110 may determine generation times of the first and second vibrations.

Subsequently, the controller 110 transmits a control signal corresponding to the first vibration to the input device 168, while displaying the specific area scaled up at a predetermined scale in step 1313. Upon completion of the enlarged display, the controller 110 controls generation of the second vibration from the portable device 100 in step 1315.

That is, when the map is zoomed-in around the enlarged area 1121 selected in FIG. 22A as illustrated in FIG. 22B, the portable device 100 generates vibration.

If the command detected in step 1305 is a zoom-out command, the controller 110 scales down the map at a predetermined scale and thus displays a larger area on the map. While displaying the larger area on the map, the controller 110 transmits a control signal corresponding to the first vibration to the input device 168 in step 1313. Upon completion of displaying of the scaled-down map, the controller 110 may control generation of the second vibration from the portable device 100 in step 1315.

Figure 23:
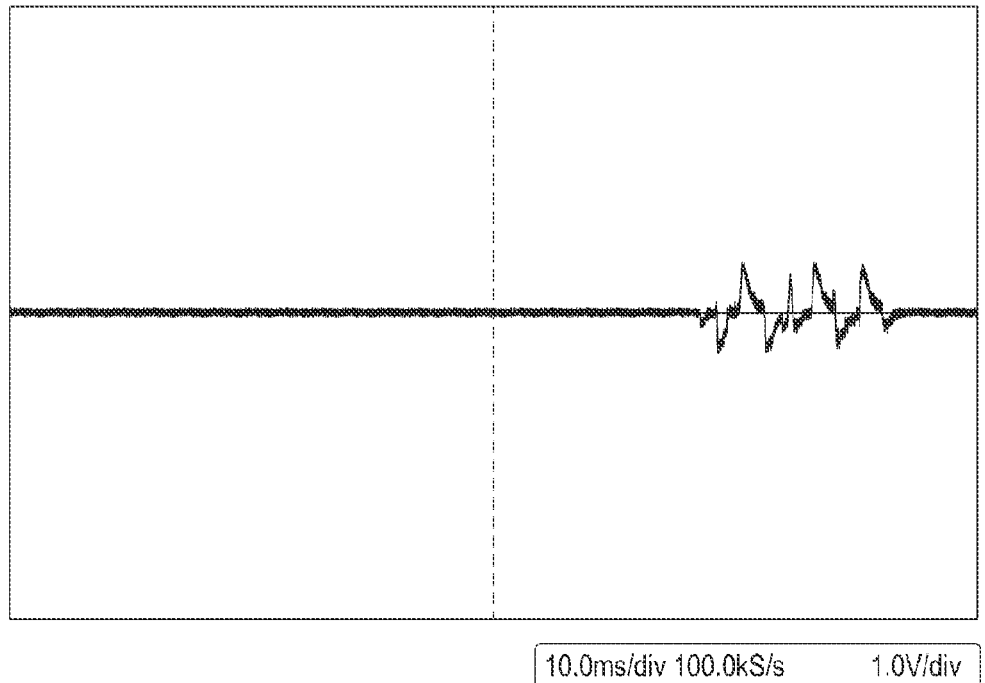
FIGS. 23 and 24 illustrate vibration waveforms according to an embodiment of the present invention.
Figure 24:
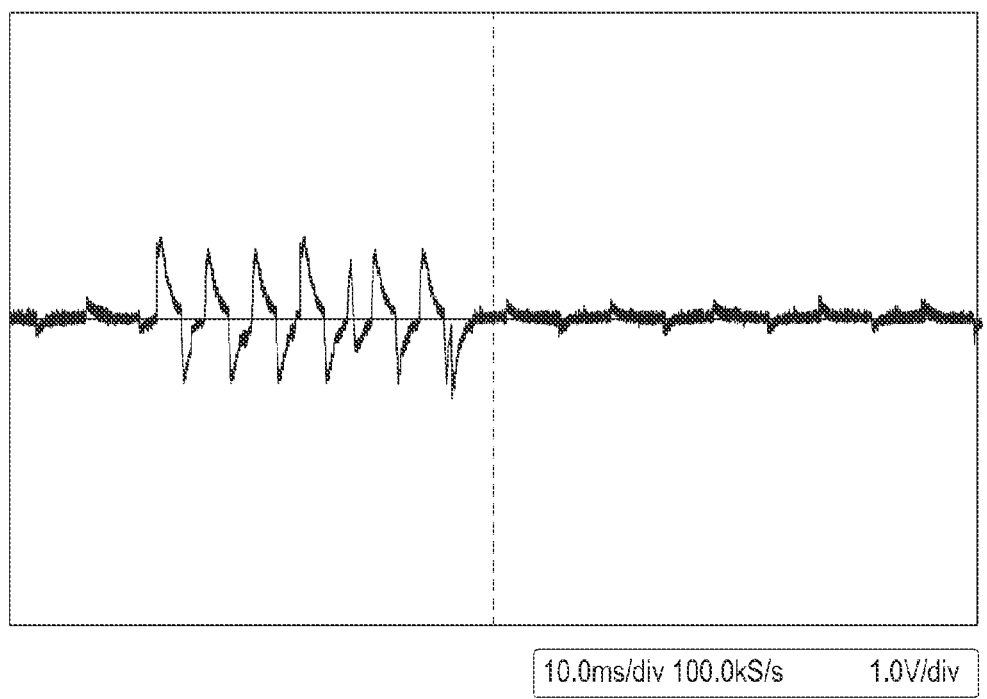

FIGS. 23 and 24 illustrate vibration waveforms generated from the input device 168 and the portable device 100, respectively. Specifically, FIG. 23 illustrates the vibration waveform of a vibration to be generated from the input device 168 and FIG. 24 illustrates the vibration waveform of a vibration to be generated from the portable device 100.

Referring to FIGS. 23 and 24, the vibration waveform generated from the input device 168 has an input value of about 0.5V, whereas the vibration waveform generated from the portable device 100 has an input value of about 1V. The vibration of the input device 168 may be set to be weaker than the vibration of the portable device 100.

As described above, since the input device 168 and the portable device 100 generate vibrations organically in response to one user input, a user can feel a realistic sense of manipulation.

The method and apparatus for controlling vibration according to the present invention may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, when a UI is manipulated in a portable device equipped with at least one touch screen, vibration can be generated organically between an input device and the portable device.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling vibration in a portable device, the method comprising:
   displaying a target object according to a progress state of an application on a touch screen;
   detecting a user input corresponding to a gesture made on the touch screen by an input device;
   detecting a state of the target object corresponding to the user input;
   detecting an action attribute of the portable device corresponding to the user input, wherein the action attribute includes at least one of application information about the application being executed at the moment of detecting the user input and a command corresponding to the user input; and
   controlling output of a first vibration from the input device and output of a second vibration from the portable device according to whether the state of the target object is a first state or a second state,
   wherein the action attribute includes application information related to a progress of a game application being executed at the moment of detecting the user input, information about the target object selected by the user input from among objects displayed on the touch screen, and a move command for the target object, and
   wherein controlling the output comprises:
      upon generation of the user input for the target object at a first position, transmitting a control signal corresponding to the first vibration to the input device; and
      if the target object is moved to a second position and displayed at the second position on the touch screen according to the move command, generating the second vibration from the portable device.

2. The method of claim 1, wherein the application information includes at least one of application identification information and information about the target object selected by the user input.

3. The method of claim 1, wherein the move command is determined according to an operation state of the portable device or the application being executed at the moment of generating the user input.

4. A portable device comprising:
   a touch screen configured to display at least one object under the control of a controller;
   a communication module configured to conduct short-range communication with an input device under the control of the controller; and
   the controller configured to display a target object according to a progress state of an application on the touch screen, to detect a user input corresponding to a gesture made on the touch screen by the input device, to detect a state of the target object corresponding to the user input, to control output of a first vibration from the input device by transmitting a control signal corresponding to the first vibration to the input device through the communication module, and to control output of a second vibration from the portable device according to whether the state of the target object is a first state or a second state,
   wherein the controller is further configured to detect an action attribute of the portable device corresponding to the user input, wherein the action attribute includes at least one of application information about the application being executed at the moment of detecting the user input and a command corresponding to the user input,
   wherein the action attribute includes application information related to a progress of a game application being executed at the moment of detecting the user input, information about the target object selected by the user input from among objects displayed on the touch screen, and a move command for the target object, and
   wherein upon generation of the user input for the target object at a first position, the controller transmits a control signal corresponding to the first vibration to the input device, and if the target object is moved to a second position and displayed at the second position on the touch screen according to the move command, the controller controls generation of the second vibration from the portable device.

5. The portable device of claim 4, wherein the application information includes at least one of application identification information and information about the target object selected by the user input.

6. The portable device of claim 5, wherein the move command is determined according to an operation state of the portable device or the application being executed at the moment of generating the user input.

* * * * *